US009987954B2

(12) United States Patent
Kimata

(10) Patent No.: US 9,987,954 B2
(45) Date of Patent: Jun. 5, 2018

(54) VEHICLE SEAT

(71) Applicant: TS TECH CO., LTD., Saitama (JP)

(72) Inventor: Shingo Kimata, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days. days.

(21) Appl. No.: 15/107,963

(22) PCT Filed: Dec. 16, 2014

(86) PCT No.: PCT/JP2014/006260
§ 371 (c)(1),
(2) Date: Jun. 24, 2016

(87) PCT Pub. No.: WO2015/098040
PCT Pub. Date: Jul. 2, 2015

(65) Prior Publication Data

US 2016/0355108 A1 Dec. 8, 2016

(30) Foreign Application Priority Data

Dec. 27, 2013 (JP) ................................ 2013-271959

(51) Int. Cl.
*B60N 2/30* (2006.01)
*B60N 2/68* (2006.01)
(Continued)

(52) U.S. Cl.
CPC ............. *B60N 2/3065* (2013.01); *B60N 2/06* (2013.01); *B60N 2/0881* (2013.01); *B60N 2/12* (2013.01);
(Continued)

(58) Field of Classification Search
CPC ...... B60N 2/3065; B60N 2/06; B60N 2/0881; B60N 2/12; B60N 2/2356; B60N 2/3011;
(Continued)

(56) References Cited

U.S. PATENT DOCUMENTS 7,040,702 B2 * 5/2006 Yamada ............... B60N 2/3009 296/65.01
7,901,005 B2 * 3/2011 Khan .................. B60N 2/3013 297/313
(Continued)

FOREIGN PATENT DOCUMENTS

JP 2005212554 8/2005
JP 4263628 5/2009
(Continued)

OTHER PUBLICATIONS

International Search Report PCT/JP2014/006260, dated Mar. 3, 2015. (3 pages).

*Primary Examiner* — Philip F Gabler
(74) *Attorney, Agent, or Firm* — Dority & Manning, P.A.

(57) ABSTRACT

An increase in the lateral dimension of a vehicle seat equipped with a tip up lock cancel mechanism is prevented. In a vehicle seat equipped with a tip up mechanism for retaining the seat cushion at least in a tip up position and a tip up lock cancel mechanism for releasing the seat cushion from a retained condition effected by the tip up mechanism in response to a forward tilting movement of the seat back, the tip up lock cancel mechanism includes a cable encasing member having one end fixed to the seat cushion and another end fixed to a back side frame via a fixing part, and a cable slidably received in the cable encasing member and having one end connected to the tip up mechanism and another end connected to a seat base, the fixing part for fixing the cable encasing member to the back side frame being located on an inner side of the back side frame.

6 Claims, 15 Drawing Sheets

(51) Int. Cl.

| | |
|---|---|
| ***B60N 2/06*** | (2006.01) |
| ***B60N 2/44*** | (2006.01) |
| ***B60N 2/46*** | (2006.01) |
| ***B60N 2/08*** | (2006.01) |
| ***B60N 2/12*** | (2006.01) |
| ***B60N 2/235*** | (2006.01) |

(52) U.S. Cl.
CPC ............ *B60N 2/236* (2015.04); *B60N 2/3011* (2013.01); *B60N 2/3013* (2013.01); *B60N 2/3047* (2013.01); *B60N 2/3075* (2013.01); *B60N 2/444* (2013.01); *B60N 2/4495* (2013.01); *B60N 2/4613* (2013.01); *B60N 2/68* (2013.01); *B60N 2002/445* (2013.01); *B60N 2002/4475* (2013.01); *B60N 2205/40* (2013.01)

(58) Field of Classification Search
CPC .. B60N 2/3013; B60N 2/3047; B60N 2/3075; B60N 2/444; B60N 2/4495; B60N 2/4613; B60N 2/68; B60N 2002/445; B60N 2002/4475; B60N 2205/40
See application file for complete search history.

(56) References Cited

U.S. PATENT DOCUMENTS

| | | | | |
|---|---|---|---|---|
| 8,152,240 B2 * | 4/2012 | Yamada | B60N 2/22 | 296/65.09 |
| 8,534,750 B2 * | 9/2013 | Sayama | B60N 2/01583 | 296/65.09 |
| 2009/0295185 A1 * | 12/2009 | Abe | B60N 2/3013 | 296/65.09 |

FOREIGN PATENT DOCUMENTS

| | | |
|---|---|---|
| JP | 2012131289 | 7/2012 |
| WO | WO 0055003 | 9/2000 |

* cited by examiner

VEHICLE SEAT

CROSS REFERENCE TO RELATED APPLICATIONS

This application is the U.S. National Stage entry of International Application Number PCT/JP2014/006260 filed under the Patent Cooperation Treaty having a filing date of Dec. 16, 2014, which, in turn, claims priority to Japanese Patent Application Serial Number 2013-271959 having a filing date of Dec. 27, 2013, the disclosures of both of which are hereby incorporated by reference herein in their entirety for all purposes.

TECHNICAL FIELD

The present invention relates to a vehicle seat that can change to a tip up condition where the seat cushion is raised to an uppermost position and to a dive down condition where the seat back is tilted forward with the seat kept in the same configuration in relation to the seat back.

BACKGROUND ART

In recent years, vehicle seats such as those for automobiles are fitted with various mechanisms and devices for selectively changing the configuration of the seat in various different ways. For instance, a seat back is pivotally attached to a high level part of the floor, and a seat cushion is pivotally attached to the seat back so as to be selectively tilted upward. With the seat cushion kept tilted up onto the seat back, the seat back may be tilted forward (toward the seat cushion).

In such a seat that can selectively change the configuration, the seat cushion can be fixed in the tip up position where the seat cushion is raised to the uppermost position so that the process of stowing the luggage in the created space may be simplified. However, to put the forwardly tilted seat back back to the use position, an operation to release the lock of the tip up lock mechanism is required. To overcome this problem, it is known to provide a lock release mechanism that automatically disables the lock by the tip up lock mechanism when the seat back is tilted forward. See Patent Document 1.

This lock release mechanism consists of a release cam pivotally attached to the cushion frame so as to be rotatable in the direction to engage the lock plate of the tip up lock mechanism and a lock release cable for rotating the release cam. The lock release cable includes a cable and an outer tube encasing the cable. One end of the cable is connected to the release cam, and the corresponding end of the outer tube is fixed to a part of the cushion frame adjoining the release cam. The other end of the cable is connected to a floor hinge that pivotally supports the seat back on the floor, and the corresponding end of the outer tube is fixed to a fixing member attached to an outer side of the lower back (back hinge) of the seat back frame. Thereby, when the seat back is tilted forward, the length of the cable extending between the floor hinge and the fixing part increases on the other end side of the cable so that the cable is pulled on the one end side thereof to rotate the release cam, thereby restricting the rotation (the locking action) of the lock plate.

PRIOR ART DOCUMENT(S)

Patent Document(s)

Patent Document 1: JP4263628B

SUMMARY OF THE INVENTION

Task to be Accomplished by the Invention

However, according to the seat proposed in Patent Document 1, because the fixing part for fixing the other end of the outer tube of the cable for the lock release mechanism is provided on the outer side of the back frame, a gap is required between the back frame and the cushion frame for placing the fixing part therein so that the lateral dimension of the seat had to be increased.

In view of such a problem of the prior art, a primary object of the present invention is to prevent the increase in the lateral dimension of a vehicle seat equipped with a tip up lock cancel mechanism.

Means for Accomplishing the Task

To achieve such an object, the present invention provides a vehicle seat comprising a seat back (S2) pivotally attached to a seat base (26), a seat cushion (S1) attached to the seat back in a rotatable manner relative to the seat back between a seating position and a tip up position tilted upward toward the seat back, a tip up mechanism (5) for retaining the seat cushion at least in the tip up position and a tip up lock cancel mechanism (113) for releasing the seat cushion from a retained condition effected by the tip up mechanism in response to a forward tilting movement of the seat back, wherein: the seat back includes a pair of back side frames (46) extending downward and connected to the seat base; and the tip up lock cancel mechanism includes a cable encasing member (109) having one end fixed to the seat cushion and another end fixed to one of the back side frames via a fixing part (112), and a cable (107) slidably received in the cable encasing member and having one end connected to the tip up mechanism and another end connected to the seat base, the fixing part (112) for fixing the cable encasing member to the back side frame being located on an inner side of the back side frame.

According to this arrangement, because the fixing part that fixes the cable encasing member to the back side frame is attached to the inner side of the back side frame, the gap between the back side frame and the cushion frame can be minimized, and the lateral dimension of the seat is not required to be increased.

In this invention, preferably, the seat back further includes a seat back frame (45) formed by connecting an upper member, a pair of side members and a lower member with one another, and the fixing part is located lower than the lower member when the seat back is in the use position.

According to this arrangement, because the fixing part is positioned in such a manner that the fixing part does not obstruct the changing of the configuration of the seat, an efficient space utilization can be achieved, and the lateral dimension of the seat is not required to be increased.

In this invention, the seat back may include a seat back frame (45) made of pipe material and a reinforcement member (47) extending between the seat back frame and each back side frame, and the fixing part is integrally formed with the reinforce member.

Because the fixing part is integrally formed with the reinforce member, no extra component is required for the fixing part, and the number of component parts and the amount of assembly work can be reduced.

In this invention, preferably, the back side frame corresponding to the fixing part is provided on an outer side of the seat base, and the fixing part projects inwardly of the seat in a position laterally corresponding to the seat base, and is configured to restrict a rearward tilting of the seat back by engaging the seat base.

According to this arrangement, because the fixing part can function as a stopper for limiting the rearward tilting movement of the seat back, no separate component is required for the stopper, and the number of component parts and the amount of assembly work can be reduced.

In this invention, preferably, the seat cushion includes a pair of cushion side frames (85) pivotally attached to the seat back at respective base ends thereof, the tip up mechanism being attached to an outer side of one of the cushion side frames, and the seat back further includes a support member (89) attached to a fastening seat (88) formed on an outer side of the corresponding back side frame and having a lower free end rotatably supporting the seat cushion, a recess (90) for passing the cable encasing member in a fore and aft direction when the seat back is in the use position being formed in an outer side part of the back side frame located below the fastening seat.

According to this arrangement, the cable encasing member is passed through a part located a laterally inside of the connecting portion between the cushion side frame and the support member, and adjacent to the connecting portion, without interfering with the tip up mechanism. Therefore, the cable encasing member can be positioned in a part which moves very little when the seat cushion is rotated.

In this invention, the base end of each cushion side frame may be positioned between the corresponding support member and the back side frame.

According to this arrangement, the dimension of the tip up mechanism provided on the outer side of the cushion side frame protruding in the lateral direction from the support member can be minimized, and the lateral dimension of the seat is not required to be increased.

The vehicle seat of the present invention may further comprise a slide mechanism for permitting the seat base to slide in the fore and aft direction and selectively fixing the seat base at a selected fore and aft position. Preferably, the slide mechanism includes a slide lock cancel cable (31) for releasing a lock of a slide position of the seat base, and the slide lock cancel cable is passed through the recess.

According to this arrangement, the cable encasing member is passed through a part located a laterally inside of the connecting portion between the cushion side frame and the support member, and adjacent to the connecting portion. Therefore, the cable encasing member can be positioned in a part which does not interfere with the tip up mechanism and moves very little when the seat cushion is rotated.

Effect of the Invention

According to such arrangements, even when equipped with a tip up lock cancel mechanism, the lateral dimension of the seat is not required to be increased.

BRIEF DESCRIPTION OF THE DRAWING(S)

DESCRIPTION OF THE PREFERRED EMBODIMENT(S)

A preferred embodiment of the present invention is described in the following with reference to the appended drawings. In the following description, the directions are based on the view of the person seated in the seat S. The directions associated with various parts of the seat S are based on the seat S in the state suitable for seating an occupant. Those component parts that are provided in pairs on either side are denoted with common numerals, and may be referred to as being on the left or on the right as required.

(Overall Structure)

Figure 1:
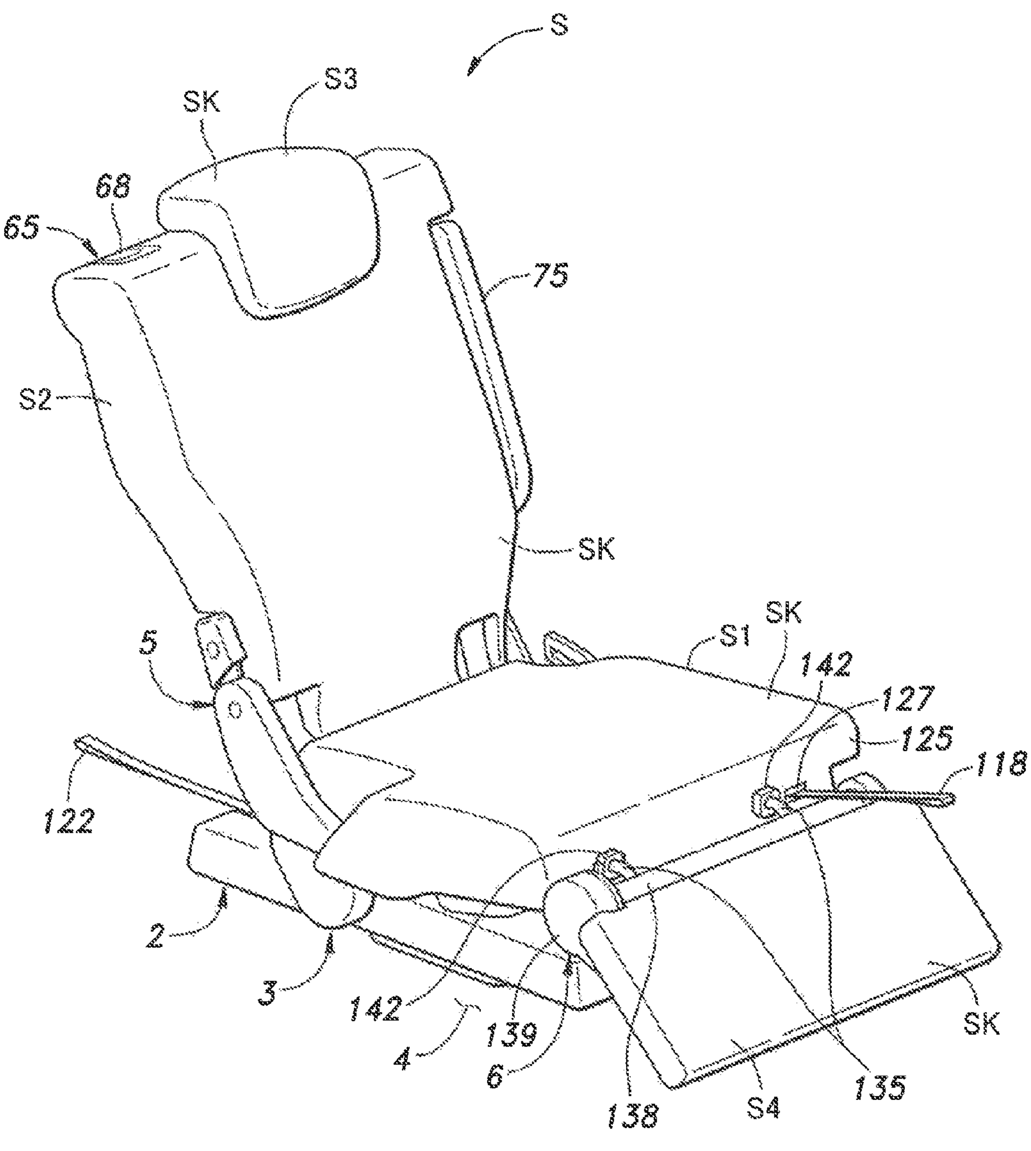
FIG. 1 is a perspective view of a vehicle seat embodying the present invention.

As shown in FIG. 1, the vehicle seat S is used as a rear seat (of a second row or a third row) of an automobile, and includes a seat cushion S1, a seat back S2, a head rest S3 and an ottoman (leg rest) S4. In some cases, only the component parts on one side of the seat are described as the seat is generally symmetric with respect to a center line extending in the longitudinal direction.

Figure 2:
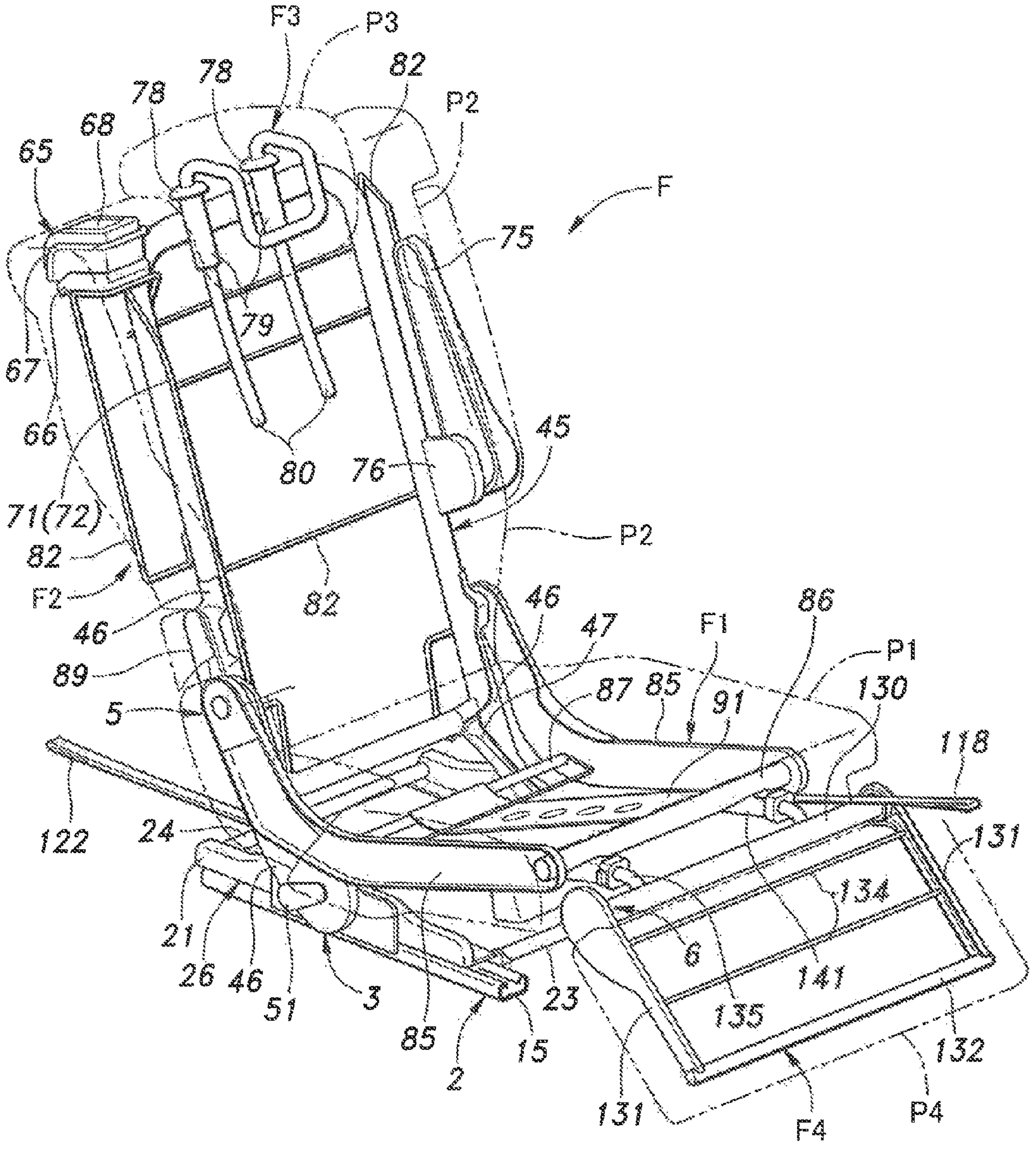
FIG. 2 is a perspective view of the seat frame of the vehicle seat.

Referring to FIG. 2 also, the seat cushion S1, the seat back S2, the head rest S3 and the ottoman S4 are internally provided with a seat frame F. The seat frame F includes a cushion frame F1 forming a frame for the seat cushion S1, a back frame F2 forming a frame for the seat back S2, a head rest frame F3 forming a frame for the head rest S3, and an ottoman frame F4 forming a frame for the ottoman S4.

The seating side of the cushion frame F1, the back resting side of the back frame F2, the head supporting side of the head rest frame F3 and the leg supporting side of the ottoman frame F4 are fitted with a seat cushion pad P1, a seat back pad P2, a head rest pad P3 and the ottoman pad P4, respectively, and each pad is made of cushion material such as polyurethane foam and covered by a skin member SK. The skin member SK is made of sheet material such as synthetic leather and fabric. The bottom side of the cushion frame F1, the back side of the back frame F2 and the reverse side of the ottoman frame F4 are fitted with respective covers made of plastic material, and the bottom surface, the back surface and the reverse surface of these frames may be defined by these covers.

The back frame F2 is attached to a floor 4 of the vehicle via a slide mechanism 2 and a reclining mechanism 3 so that the back frame F2 is slidable with respect to the floor 4, and rotatable (tiltable) with respect to the slide mechanism 2. The cushion frame F is rotatably attached to the back frame F2 via a tip up mechanism 5. The head rest frame F3 is slidably attached to the back frame F2. The ottoman frame F4 is slidably attached to the cushion frame F1. The ottoman frame F4 is provided with an angle adjustment mechanism 6 so as to be tiltable.

Figure 3:
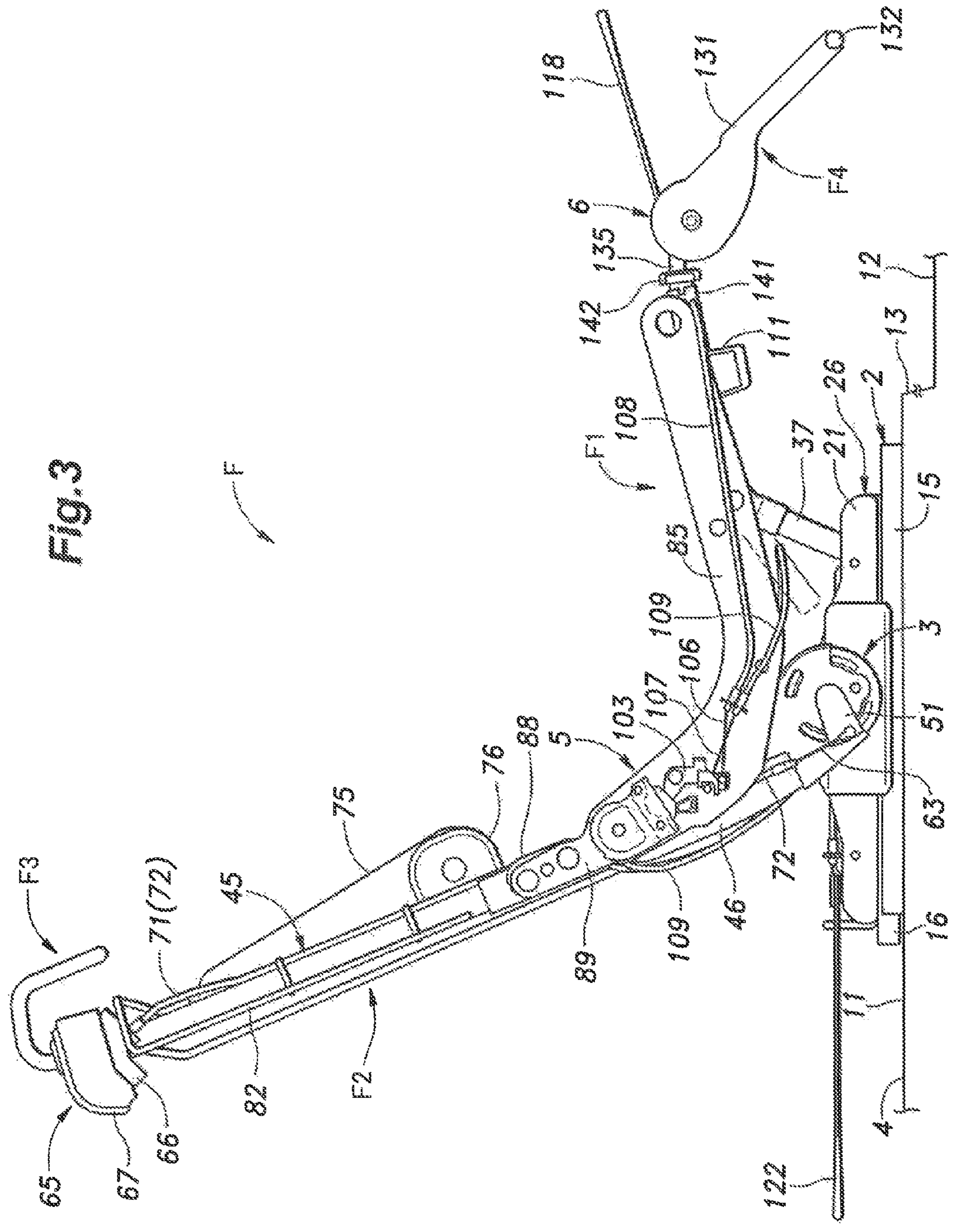
FIG. 3 is a right side view of the seat frame of the vehicle seat.

As shown in FIG. 3, the floor 4 includes a high level part 11 having the slide mechanism 2 attached thereto and a low level part 12 located in front of the high level part 11 at a lower level. An upright wall 13 is provided between the high level part 11 and the low level part 12 as a transitional part. The floor 4 is covered by an upholstery material such as unwoven fabric made by needle punching, for instance. The low level part 12 of the floor 4 is covered by a floor mat which may be laid over the upholstery material.

As shown in FIGS. 4 to 7, the slide mechanism 2 includes a pair of slide mechanism parts positioned on either side of the seat S, and each slide mechanism part includes a low er rail 15, an upper rail 16 slidably mounted on the lower rail 15 and a rail lock member 17 for fixedly securing the upper rail 16 on the lower rail 15. The slide mechanism 2 may consist of any per se known type. The lower rails 15 extend in the fore and aft direction laterally spaced from each other on the high level part 11 (FIG. 3) of the floor 4. Each lower rail 15 is attached to the floor 4 by using screws or the like. Each upper rail 16 is engaged by the corresponding lower rail 15 in a slidable manner in the fore and aft direction. Only one of the slide mechanism parts is described in the following description as the two parts are essentially identical to each other.

The lower rail 15 is formed with a plurality of lock holes (not shown in the drawings) arranged in the lengthwise direction. The rail lock member 17 is pivotally attached to the upper rail 16 so as to be engageable with a selected one of the lock holes. The rail lock member 17 prevents the movement of the upper rail 16 and a slide member 21 attached thereto relative to the lower rail 15. The rail lock member 17 is urged by a biasing means consisting of a spring (not shown in the drawings) into engagement with a selected one of the lock holes. Normally, the rail lock member 17 is kept engage by the lock hole under the biasing force of the spring, and prevents the movement of the slide member 21. When the rail lock member 17 is pivoted by the operation of a vehicle occupant against the biasing force of the spring, the rail lock member 17 is disengaged from the lock hole, and the upper rail 16 is rendered moveable.

The slide member 21 which is attached to the upper rail 16 is made by welding a plurality of stamp formed sheet metal pieces together. The slide member 21 extends along the length of the upper rail 16. The two slide members 21 are connected to each other by a slider front member 23 at the front ends, by a slider rear member 24 at the rear ends, and by a slider middle member 25 at the middle parts. These cross members 23, 24 and 25 are made of metallic pipe stock, and are connected to the slide members 21 by welding or by using screws, and extend laterally parallel to one another. Thus, the slide members 21 and the cross members 23, 24 and 25 jointly form a frame structure serving as a seat base 26. The seat base 26 and the two upper rails 16 are thus designed to move in the fore and aft direction as a single body.

Figure 4:
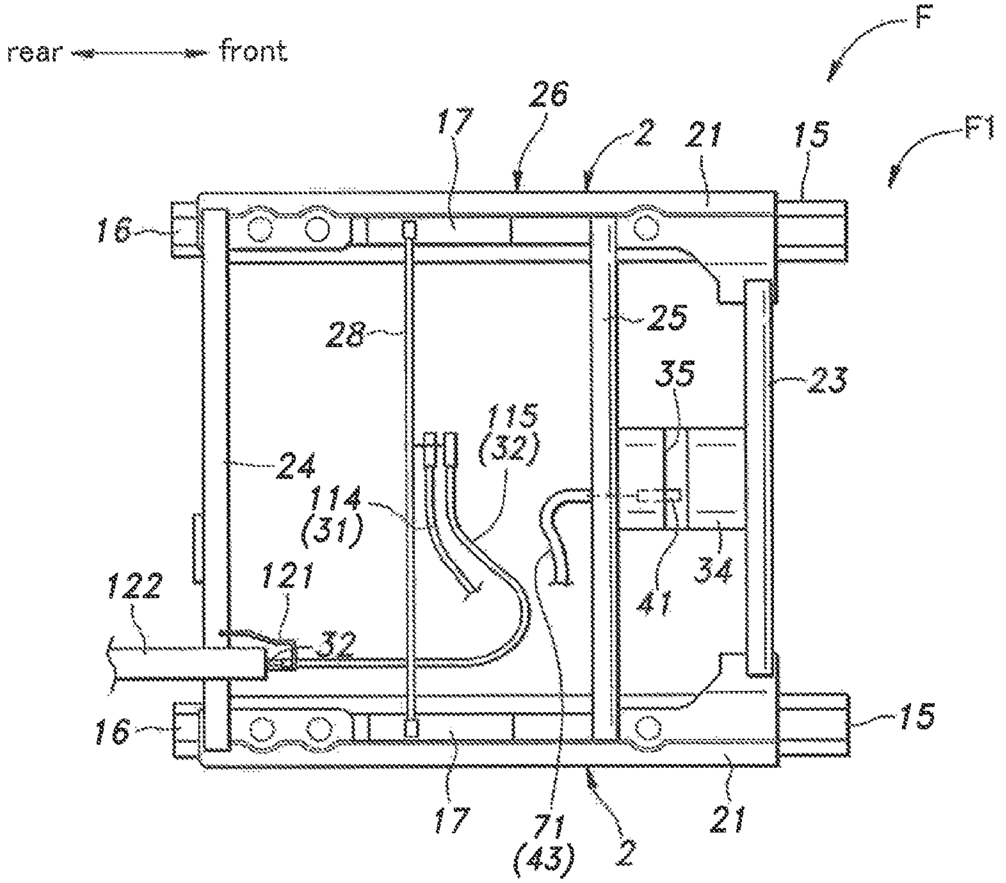
FIG. 4 is a plan view of the base frame of the vehicle seat.
Figure 5:
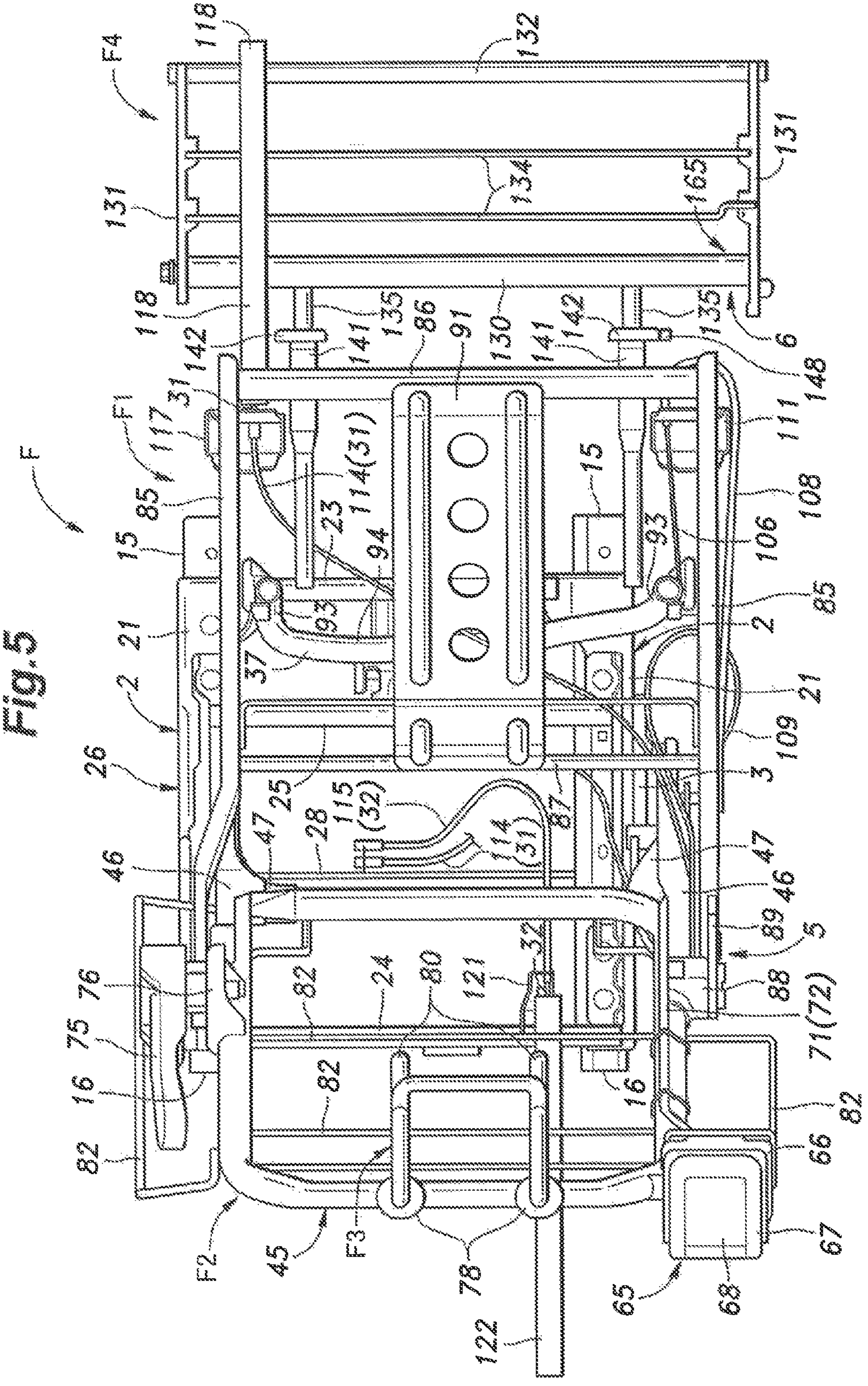
FIG. 5 is a plan view of the seat frame of the vehicle seat.
Figure 6:
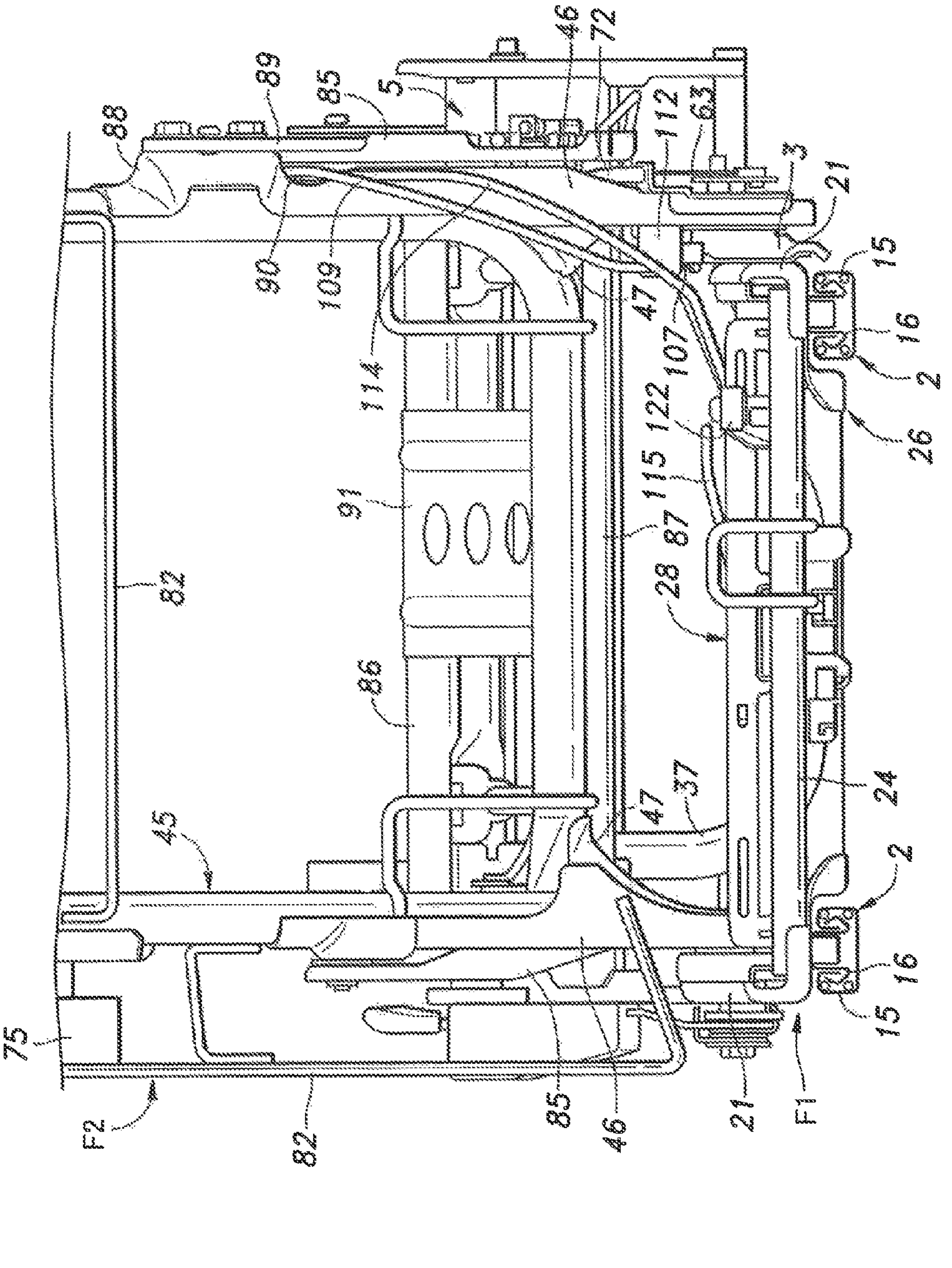
FIG. 6 is a rear view of the seat frame of the vehicle seat.

The right and left rail lock members 17 are connected to each other via a link mechanism 28 (FIGS. 4 to 6). The link mechanism 28 can change between a locked condition and a released condition, and is normally placed in the locked condition under the biasing force of the spring urging the rail lock members 17. In the locked condition, the link mechanism 28 permits the engagement of the rail lock member 17 with the selected lock hole. When the link mechanism 28 is changed from the locked condition to the released condition by the operation of the vehicle occupant, the link mechanism 28 keeps the rail lock member 17 disengaged from the lock hole against the biasing force of the spring. As will be described hereinafter, an end of a first rail cable 31 and an end of a second rail cable 32 are connected to the link mechanism 28 for transmitting force thereto. The link mechanism 28 is disengaged when at least one of the first rail cable 31 and the second rail cable 32 is pulled.

Figure 8:
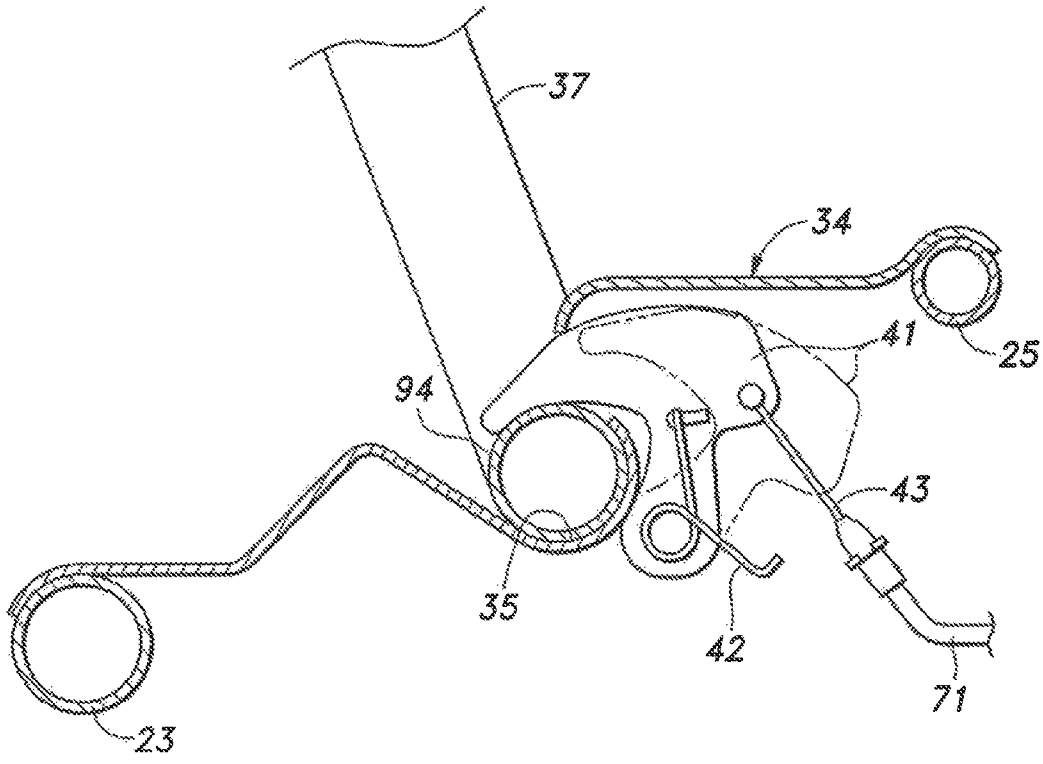
FIG. 8 is a fragmentary sectional view of the stand base.

As shown in FIGS. 4 and 8, a stand base 34 is placed across the slider front member 23 and the slider middle member 25. The stand base 34 is made by stamp forming sheet metal, and is welded to a laterally middle part of the slider front member 23 at the front end and to a laterally middle part of the slider middle member 25 at the rear end. A support groove 35 extends laterally on the upper side of the stand base 34 over the entire width of the stand base 34. The support groove 35 opens out in an upper and forward direction for supporting a stand leg 37 which will be described hereinafter.

The stand base 34 is provided with a pivotable engagement claw 41 having a rotational center line extending in parallel with the (laterally extending) axial line of the support groove 35, and can take a projecting position projecting from a side of the support groove 35 into the support groove 35 as shown by the solid lines in FIG. 8 and a retracted position cleared from the support groove 35 as shown by the imaginary lines in FIG. 8. A torsion spring 42 is interposed between the stand base 34 and the engagement claw 41 to urge the engagement claw 41 into the projecting position. In the projecting position, the engagement claw 41 engages a cross member 94 of the stand leg 37 to prevent the cross member 94 from leaving the support groove 35. The outer side of the engagement claw 41 or the side of the engagement claw 41 facing the open side of the support groove 35 when the engagement claw 41 is in the projecting position is formed as an inclined surface.

As will be discussed hereinafter, an end of an engagement claw cable 43 is connected to the engagement claw 41 to transmit force thereto. By pulling the engagement claw cable 43, the engagement claw 41 is caused to pivot from the projecting position to the retracted position.

As shown in FIGS. 2, 5 and 6, the back frame F2 includes a pipe frame 45 formed as an elongated rectangular frame and a pair of back side frames 46 welded to either vertically extending lower side part of the pipe frame 45. The back side frames 46 are formed by stamp forming sheet metal. Each back side frame 46 is provided with a concave surface surrounding the outer side surface of the lower part of the corresponding side part of the pipe frame 45. The lower part of each back side frame 46 extends downward beyond the corresponding side part of the pipe frame 45. A part of each back side frame 46 extends to a lower part of the pipe frame 45, and is welded thereto. A reinforcement plate 47 extends across each back side frame 46 and the adjoining lower part of the pipe frame 45, and welded to these components for the reinforcement of the back frame F2. The upper part of each reinforcement plate 47 forms a hollow, three-dimensional structure in cooperation with the corresponding back side frame 46 and the pipe frame 45, and the lower part thereof extends downward along the corresponding back side frame 46.

Figure 7:
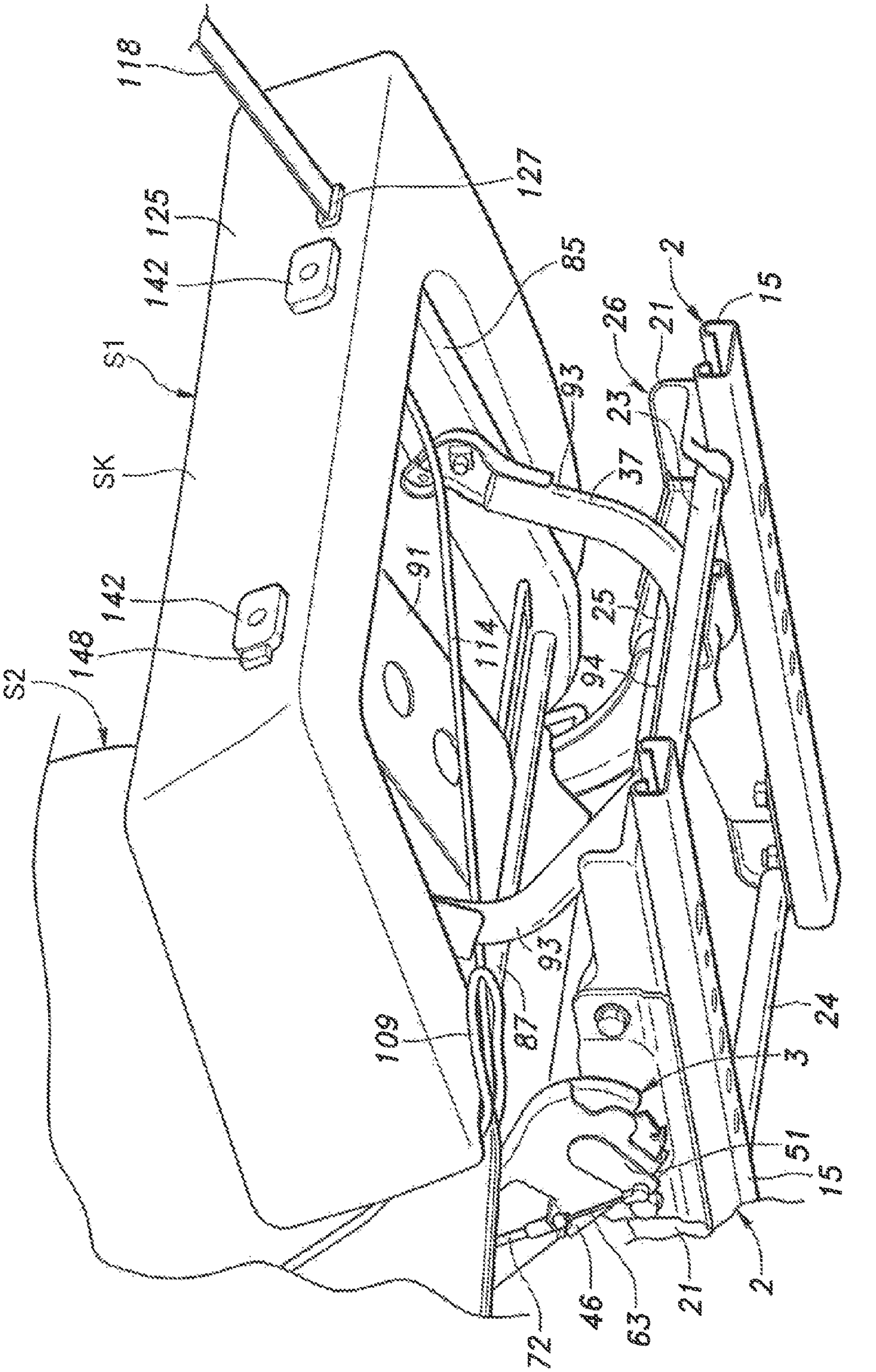
FIG. 7 is a perspective view of the seat frame of the vehicle seat as seen from a lower front direction.

Each back side frame 46 defines a pair of side surfaces facing either lateral direction. The left side surface of the lower part of the left back side frame 46 opposes the right side surface of the left slide member 21, and is connected thereto in a rotatable manner. As shown in FIGS. 5 to 7, the left side surface of the lower part of the right back side frame 46 opposes the right side surface of the reclining mechanism 3 attached to the right slide member 21, and is connected to the right slide member 21 in a rotatable manner, via the reclining mechanism 3. The rotational center lines of the right and left back side frames 46 are coaxially disposed.

The reclining mechanism 3 is configured to keep the rotational (tilting) angle of the right back side frame 46 relative to the right slide member 21 at a selected angle. The reclining mechanism 3 is provided with a release lever 51 (FIG. 7) that can be operated to change the rotational angle of the right back side frame 46 relative to the right slide member 21. The reclining mechanism 3 may consist of any per se known mechanism.

Figure 9:
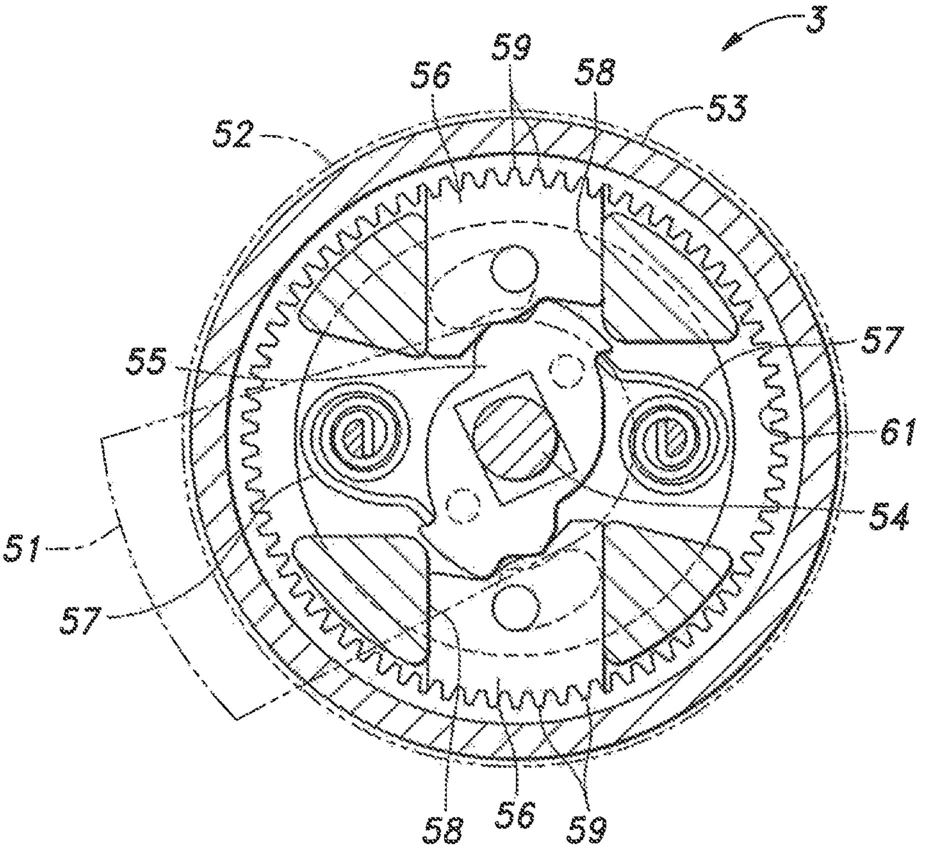
FIG. 9 is a fragmentary view of the reclining mechanism.

As shown in FIG. 9, the reclining mechanism 3 used in the illustrated embodiment includes a lower plate 52 attached to the right slide member 21, an upper plate 53 attached to a lower part of the right side frame opposite to the lower plate 52 so as to be rotatable relative to the lower plate 52, a connecting shaft 54 passed through the rotational centers of the lower plate 52 and the upper plate 53, a cam plate 55 positioned in an inner space defined between the upper plate 53 and the lower plate 52 and rotationally fast with the connecting shaft 54, a plurality of lock members 56 positioned in the inner space and a torsion spring 57 urging the cam plate 55 in a rotational direction. The lock members 56 are engaged by respective guide grooves 58 formed in the lower plate 52 so as to be movable in the radial direction of the lower plate 52. Each lock member 56 is provided with a cam in the radially inner end thereof and external teeth 59 in the radially outer end thereof, the external teeth 59 engaging internal teeth 61 formed on the inner peripheral part of the upper plate 53 (defining the inner space) when the lock member 56 is displaced to the radially outer position thereof. The cam plate 55 engages the cam followers of the lock members 56 such that the lock members 56 are displaced radially outward when the cam plate 55 is turned in one direction, and the lock members 56 are displaced radially inward when the cam plate 55 is turned in the other direction. An end of the connecting shaft 54 is passed through the upper plate 53 and the right back side frame 46, and is connected to the radially extending release lever 51 (FIGS. 3 and 7) at the terminal end of the connecting shaft 54.

In the reclining mechanism 3, normally, the cam plate 55 is urged in the one rotational direction by the torsion spring 57 so that the lock member 56 is displaced to the radially outward position, and the external teeth 59 of the lock members 56 engage the internal teeth 61 of the upper plate 53. As a result, the lock member 56 prevents the relative rotation between the lower plate 52 and the upper plate 53. In other words, the reclining mechanism 3 is normally placed under a locked condition where the relative rotation between the lower plate 52 and the upper plate 53 is prohibited owing to the biasing force of the torsion spring 57. When the release lever 51 is turned in the release direction by the vehicle operator so that the connecting shaft 54 and the cam plate 55 are turned in the other direction against the biasing force of the torsion spring 57, the lock member 56 is displaced to the radially inward position, and the external teeth 59 of the lock member 56 are disengaged from the internal teeth 61 of the upper plate 53. As a result, the relative rotation between the lower plate 52 and the upper plate 53 is enabled. An end of a reclining cable 63 (FIGS. 3 and 7) is connected to the release lever 51 for transmitting the operating force. When the reclining cable 63 is pulled, the release lever 51 rotates in the release direction.

As shown in FIGS. 2, 3 and 5, a bracket 66 for supporting a handle unit 65 is attached to the upper end of the right side part of the pipe frame 45 by welding. The handle unit 65 includes a case 67 with an upwardly and rearwardly facing opening and a handle 68 pivotally attached to the case 67 therein. As shown in FIGS. 1 and 2, the part of the seat back pad P2 corresponding to the handle unit 65 and the corresponding part of the skin member SK are removed so that the handle 68 may be exposed in the upper right part of the seat back S2 for a vehicle occupant to operate.

The handle 68 is connected to an end of the engagement claw cable 43 whose other end is connected to the engagement claw 41 (FIG. 8) and an end of the reclining cable 63 whose other end is connected to the release lever 51 (FIG. 3). The engagement claw cable 43 and the reclining cable 63 are encased in respective outer tubes 71, 72 in a slidable manner. Referring to FIG. 5, although not shown in any great detail, an end of the engagement claw outer tube 71 encasing the engagement claw cable 43 is attached to the stand base 34, and extends along the right slide member 21 and upward along the right back side frame 46 and the right side part of the pipe frame 45 before being attached to the bracket 66 at the other end. As shown in FIG. 3, an end of the reclining outer tube 72 encasing the reclining cable 63 is attached to the right side surface of the right back side frame 46, and extends upward along the right back side frame 46 and the right side part of the pipe frame 45 before being attached to the bracket 66 at the other end. The engagement claw outer tube 71 and the reclining outer tube 72 are bundled together by a band tie, and attached to the right side part of the pipe frame 45.

When the vehicle occupant pulls the handle 68 to cause the handle 68 to tilt in a prescribed direction, the engagement claw cable 43 is pulled toward the handle 68 so that the engagement claw 41 (FIG. 8) rotates from the projecting position to the retracted position, and the engagement claw 41 that locks the stand leg 37 is released. At the same time, the reclining cable 63 is pulled toward the handle 68 so that the release lever 51 is tilted in the release direction, and the lock on the reclining mechanism 3 is released.

As shown in FIGS. 2 and 3, an armrest bracket 76 for supporting an armrest 75 is attached to the left side part of the pipe frame 45 by welding. The armrest bracket 76 projects forward from the left side part of the pipe frame 45. The armrest 75 is attached to the armrest bracket 76 so as to be rotatable within a prescribed angular range.

As shown in FIGS. 2 and 5, a pair of head rest retaining portions 78 for supporting the head rest S3 are attached to the upper end part of the pipe frame 45. Each head rest retaining portion 78 consists of a tubular member which receives a support 79 consisting of a tubular member made of plastic material. The head rest S3 is mounted on the top end part of the pipe frame 45 via a pair of head rest pillars 80 included in the head rest frame F3 which are inserted in the respective supports 79 of the head rest retaining portion 78.

A plurality of auxiliary frames 82 each consisting of a metallic rod member are attached to respective suitable parts of the pipe frame 45. The auxiliary frames 82 include those extending between the right and left side parts of the pipe frame 45 and those extending rightward and leftward from the right and left side parts of the pipe frame 45, respectively. The auxiliary frames 82 fill the gaps in the pipe frame 45 so that the seat back pad P2 may be supported in a stable manner.

As shown in FIGS. 2 and 5, the cushion frame F1 includes a pair of cushion side frames 85 extending in the fore and aft direction along either side of the cushion frame F1, a cushion front member 86 connected between the front ends of the cushion side frames 85, and a cushion rear member 87 connected between the rear ends of the cushion side frames 85. Each cushion side frame 85 is made by stamp forming sheet metal, and has a major plane facing in the lateral direction. The peripheral part of each cushion side frame 85 is bent in the outboard direction. While the front end of each cushion side frame 85 extends in the fore and aft direction, the rear end of each cushion side frame 85 is bent upward and rearward relative to the front part. The cushion rear member 87 is attached to the bent part of the corresponding cushion side frame 85.

The rear end part of the left cushion side frame 85 is rotatably attached to the left back side frame 46 such that the right side surface of the left cushion side frame 85 opposes the upper part of the left side surface of the left back side frame 46.

As shown in FIG. 6, a fastening seat 88 is formed in an upper part of the right back side frame 46. The fastening seat 88 projects rightward, and defines a flat projecting end. A support plate 89 is attached to the fastening seat 88 by using threaded bolts. A part of the right back side frame 46 immediately below the fastening seat 88 is provided with a recess 90, and a gap is defined between the recess 90 and the support plate 89. The support plate 89 is a vertically extending metallic plate having a laterally directed major plane, and is attached to the fastening seat 88 at the upper end thereof. The lower part of the support plate 89 is spaced from the right side surface of the right back side frame 46. The rear end of the right cushion side frame 85 is positioned between the right back side frame 46 and the support plate 89, and is attached to the support plate 89 in a rotatable manner. The rotational center lines of the right and left cushion frames F1 extend laterally in a coaxial relationship.

Referring to FIGS. 2 and 5 once again, a center support member 91 extending in the fore and aft direction is connected between the cushion front member 86 and the cushion rear member 87. The center support member 91 supports the seat cushion pad P1 and the hip of the vehicle occupant from below in the central part of the cushion frame F1, and is preferably provided with a resiliency. In the illustrated embodiment, the center support member 91 consists of a plate member (center plate) formed by stamp formed sheet metal, and is provided with a vertically facing major plane. The front end of the center support member 91 is welded to the laterally central part of the cushion front member 86, and the rear end thereof is welded to the laterally central part of the cushion rear member 87. The lateral width of the center support member 91 is about one third (⅓) of that of the cushion front member 86. The center support member 91 may be provided with beads for reinforcement and openings for reducing the weight. Alternatively, the center support member 91 may be made of elastic members such as wire spring, and may be provided in a plurality of locations along the lateral direction.

As shown in FIG. 7 also, the stand leg 37 is pivotally attached to the two cushion side frames 85. The stand leg 37 includes a pair of arms 93 each having a base end pivotally attached to the corresponding cushion side frame 85 and a cross member 94 connected between the other ends of the arms 93 so that the stand leg 37 is provided with the shape of letter U. The most part of the arms 93 and the cross member 94 are made by bending a metallic pipe in the shape of letter U. The one end of each arm 93 is formed by a bracket welded to the metallic pipe. In side view (FIG. 3), the stand leg 37 is pivotable between a retracted position where the cross member 94 adjoins the lower surface of the center support member 91 and the arms 93 extend along the respective cushion side frames 85 as shown by the imaginary lines and a use position or a deployed position where the arms 93 project downward from the respective cushion side frames 85 as shown by the solid lines. In either position, the stand leg 37 is located on the outside of the cover defining the bottom surface of the seat cushion S1.

When the stand leg 37 is in the use position, the stand leg 37 can fit into the support groove 35 of the stand base 34. When the stand leg 37 is engaged by the support groove 35, the seat cushion S1 is retained by the stand leg 37 from below, and is kept in the seating position where the seat surface (upper surface) thereof extends substantially horizontally. When engaged by the support groove 35, the stand leg 37 is prevented from pivoting from the use position to the retracted position. In other words, by being engaged by the support groove 35, the angular position of the seat cushion S1 relative to the seat back S2 is determined.

When inserting the cross member 94 of the stand leg 37 into the support groove 35, the cross member 94 is pushed against the inclined surface of the engagement claw 41 to cause the engagement claw 41 to rotate from the projecting position to the retracted position against the biasing force of the torsion spring 42. Once the cross member 94 is forced into the support groove 35, the engagement claw 41 rotates back into the projecting position under the biasing force of the torsion spring 42. When placed in the projecting position, the engagement claw 41 engages the cross member 94, and prevents the cross member from being detached from the support groove 35. When the cross member 94 is desired to be disengaged from the support groove 35, the vehicle occupant operates the handle 68 (FIG. 1), and displaces the engagement claw 41 to the retracted position via the engagement claw cable 43.

As shown in FIGS. 3, 5 and 6, the tip up mechanism 5 is interposed between the right cushion side frame 85 and the support plate 89. The tip up mechanism 5 fixedly secures the right cushion side frame 85 to the support plate 89 to fix the angular position of the seat cushion S1 relative to the seat back S2 such that the seat cushion S1 is tilted upward from the seating position. The tip up mechanism 5 may consist of any per se known mechanism.

Figure 10:
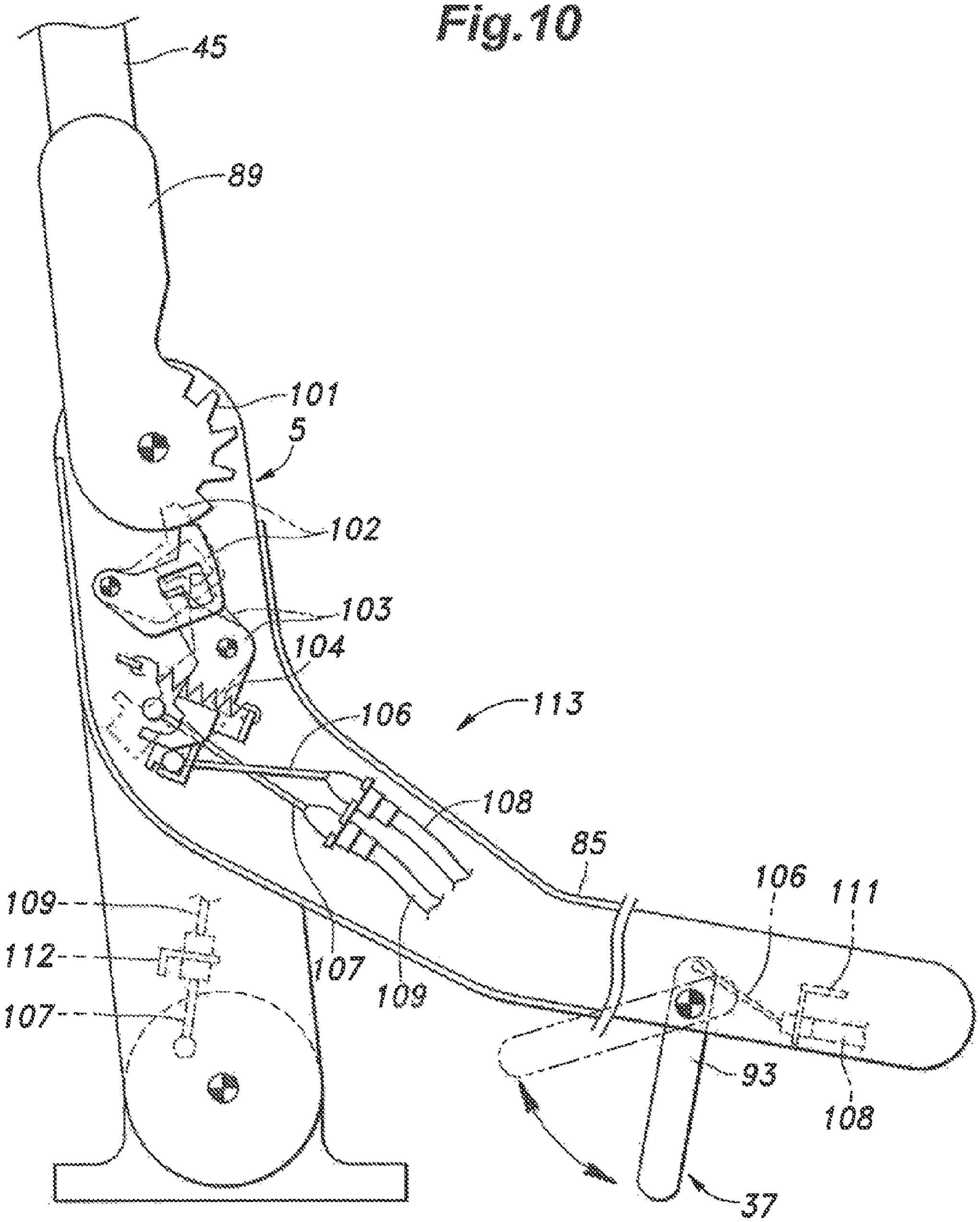
FIG. 10 is a fragmentary view of the tip up mechanism.

As shown in FIG. 10, the tip up mechanism 5 of the illustrated embodiment includes a plurality of engagement notches 101 formed in the lower edge of the support plate 89, a lock member 102 pivotally attached to the right side surface of the right cushion side frame 85 and moveable between an engagement position engaging one of the engagement notches 101 indicated by the imaginary lines and a release position disengaged from the engagement notches 101 indicated by the solid lines, a rubber member (not shown in the drawings) urging the lock member 102 to the engagement position, a cam member 103 pivotally attached to the right side surface of the right cushion side frame 85 and configured to pivot between a first position for engaging the lock member 102 to position the lock member 102 in the engagement position as indicated by the solid lines and a second position for disengaging the lock member 102 as indicated by the imaginary lines, and a tension coil spring 104 positioned between the cam member 103 and the right side surface of the right cushion side frame 85 to urge the cam member 103 toward the second position.

The number of the engagement notches 101 may be one or greater. One of the engagement notches 101 is located so as to engage the lock member 102 when the seat cushion S1 is located in an upper limit position (tip up position) in the angular range of the seat cushion S1 or when the seat surface (upper surface) of the seat cushion S1 is closest from the support surface (front surface) of the seat back S2. When the seat cushion S1 is in the tip up position, the front part of the right cushion side frame 85 is substantially in parallel with the right side part of the pipe frame 45. The remaining engagement notches 101 may be provided in positions for engaging the lock member 102 at various angular positions between the seating position and the tip up position of the seat cushion S1. Therefore, owing to the tip up mechanism 5, when the right cushion side frame 85 is upwardly rotated relative to the support plate 89, the lock member 102 can engage the corresponding engagement notch 101 under the biasing force of the tension coil spring 104 at the selected angular position.

The engagement notches 101 may be configured such that the engagement with the lock member 102 is maintained when the right cushion side frame 85 is forced in the direction to tilt downward relative to the support plate 89 so as to prevent the rotation of the right cushion side frame 85 relative to the support plate 89, and the disengagement of the lock member 102 is permitted when the right cushion side frame 85 is forced to tilt upward relative to the support plate 89 so as to permit the rotation of the right cushion side frame 85 relative to the support plate 89. According to such an arrangement, even after the lock member 102 has been engaged by one of the engagement notches 101, the upward tiling of the right cushion side frame 85 is permitted. As the right cushion side frame 85 is further tilted upward, the lock member 102 is engaged by the succeeding engagement notch 101. Therefore, even when the cam member 103 is in the second position indicated by the imaginary lines, the right cushion side frame 85 can be tilted upward to a desired angle.

When the cam member 103 is angularly displaced by the operation of the vehicle occupant to the first position indicated by the solid lines against the biasing force of the tension coil spring 104, the lock member 102 moves to the release position, and is prevented from being engaged by the engagement notches 101. An end of a first tip up cable 106 and an end of a second tip up cable 107 are connected to the cam member 103 for transmitting force. The first tip up cable 106 in encased in a first tip up outer tube 108, and the second tip up cable 107 is encased in a second tip up outer tube 109, each in a slidable manner.

An end of the first tip up outer tube 108 is attached to the right side surface of the right cushion side frame 85 such that the corresponding opening of the first tip up outer tube 108 faces the cam member 103. As shown in FIGS. 3 and 5, the first tip up outer tube 108 extends forward from the one end thereof along the right side surface of the right cushion side frame 85, and after being passed under the front end of the right cushion side frame 85, reaches the left side of the right cushion side frame 85. A bracket 111 is attached to the lower front end part of the right cushion side frame 85, and the other end of the first tip up outer tube 108 is fixedly secured to the bracket 111 so that the corresponding opening of the first tip up outer tube 108 faces rearward. The other end of the first tip up cable 106 is fixedly attached to an end part of the right arm 93 of the stand leg 37. As shown in FIG. 10, when the stand leg 37 is in the retracted position indicated by the imaginary lines, the other end of the first tip up cable 106 (on the side of the right arm 93) approaches the other end of the first tip up outer tube 108 so that the first tip up cable 106 slackens. When the stand leg 37 is in the use position indicated by the solid lines, the other end of the first tip up cable 106 (on the side of the right arm 93) moves away from the other end of the first tip up outer tube 108 so that the first tip up cable 106 is tensioned. In other words, when the stand leg 37 is in the use position, the cam member 103 is pulled by the first tip up cable 106 to be placed in the first position indicated by the solid lines in FIG. 10, and the lock member 102 is placed in the release position also indicated by the solid lines.

An end of the second tip up outer tube 109 is attached to the right side surface of the right cushion side frame 85 such that the corresponding opening of the second tip up outer tube 109 faces the cam member 103. As shown in FIGS. 3 and 5, the second tip up outer tube 109 extends from the one end thereof, and is passed under the longitudinally middle part of the right cushion side frame 85 to the left side of the right cushion side frame 85. The second tip up outer tube 109 then extends along the left side surface of the right cushion side frame 85, and reaches a part adjoining the rotational center of the right cushion side frame 85. Thereafter, as shown in FIGS. 3 and 6, the second tip up outer tube 109 is passed from the part adjoining the rotational center of the right cushion side frame 85 to the rear of the right back side frame 46, and extends along the reinforcement plate 47 provided on the left side of the right back side frame 46 before reaching a part adjoining the rotational center of the right back side frame 46. The other end of the second tip up outer tube 109 is fixedly attached to a projection 112 (FIG. 6) integrally formed with the reinforcement plate 47 so as to project inward from the left side surface of the reinforcement plate 47. The other end of the second tip up outer tube 109 is directed downward. The second tip up cable 107 is engaged by the left side surface of a lower plate 52 (FIG. 9) attached to the right slide member 21. The projection 112 functions not only as a fixing part for fixedly securing the other end of the second tip up outer tube 109 but also as a stopper for preventing further rearward rotation of the right back side frame 46 by engaging the right slide member 21 when the right back side frame 46 tilts rearward as the projection 112 projects to a position laterally overlapping with the right slide member 21.

The positions of the other end of the second tip up cable 107 and the other end of the second tip up outer tube 109 are determined such that the other end of the second tip up cable 107 moves away from the other end of the second tip up outer tube 109 as the seat back S2 tilts forward from an upright position relative to the floor 4. As a result, as the seat back S2 tilts forward, the second tip up cable 107 is pulled toward the other end thereof. Once the forward tiling angle of the seat back S2 exceeds a prescribed value, the cam member 103 (FIG. 10) reaches the first position indicated by the solid lines in FIG. 10 by being pulled by the second tip up cable 107, and the lock member 102 is positioned in the release position also indicated by the solid lines. In other words, the combination of the first tip up cable 106 and the first tip up outer tube 108, and the combination of the second tip up cable 107 and the second tip up outer tube 109 form tip up lock cancel mechanisms 113, respectively, for unlocking the tip up mechanism 5.

Because the first tip up cable 106 and the second tip up cable 107 are both connected to the cam member 103, the cam member 103 is brought to the first position when at least one of the first tip up cable 106 and the second tip up cable 107 is pulled toward the other end side, and the lock member 102 is placed in the release position. In other words, when the first tip up cable 106 and the second tip up cable 107 are both slackened, or when the forward tilt angle of the seat back S2 is below a prescribed value (or when the seat back S2 is in an upright position) and the stand leg 37 is in the retracted position, the cam member 103 is placed in the second position indicated by the imaginary lines in FIG. 10, and the lock member 102 is enabled to engage one of the engagement notches 101.

The layout of the first rail cable 31 and the second rail cable 32 is described in the following. As shown in FIG. 5, the first rail cable 31 is encased in a first rail outer tube 114 in a slidable manner, and the second rail cable 32 is encased in a second rail outer tube 115 in a slidable manner. An end of each of the first rail outer tube 114 and the second rail outer tube 115 is connected to an immobile part of the link mechanism 28, and a corresponding end of each of the first rail cable 31 and the second rail cable 32 is connected to the moveable part of the link mechanism 28. Alternatively, an end of each of the first rail outer tube 114 and the second rail outer tube 115 may be connected to the slider middle member 25 or the slider rear member 24.

The first rail outer tube 114 extends from the one end thereof along the left side surface of the right back side frame 46, and upward along the left side surface of the right back side frame 46 before reaching a part adjoining the rotational center of the right cushion side frame 85. Thence, the first rail outer tube 114 is passed behind the right back side frame 46, and reaches the right side surface of the right back side frame 46 before extending from the rotational center of the right cushion side frame 85 to the left side surface of the right cushion side frame 85. Thereafter, as shown in FIG. 5, the first rail outer tube 114 extends forward along the left side surface of the right cushion side frame 85, and is passed obliquely forward and leftward under the center support member 91 before reaching a bracket 117 attached to the lower part of the front end of the left cushion side frame 85. The other end of the first rail outer tube 114 is attached to the bracket 117 so as to direct the opening thereof forward. The corresponding end of the first rail cable 31 projects forward from the other end of the first rail outer tube 114, and is connected to a first grip member 118. The first rail cable 31, the first rail outer tube 114 and the first grip member 118 jointly form an operation member for unlocking the slide mechanism 2.

The second rail outer tube 115 forms a loop extending from the one end thereof, and extends rearward before reaching a bracket 121 attached to the slider rear member 24. The other end of the second rail outer tube 115 is secured to the bracket 121 so as to direct the opening thereof rearward. The corresponding end of the second rail cable 32 projects rearward from the other end of the second rail outer tube 115, and is connected to a second grip member 122. The second rail cable 32, the second rail outer tube 115 and the second grip member 122 jointly form an operation member for unlocking the slide mechanism 2.

The first grip member 118 and the second grip member 122 may each consist of a flexible strap made of fabric, string or rope. In the illustrated embodiment, each of the first grip member 118 and the second grip member 122 is made by folding a strip of fabric into a loop. As shown in FIGS. 1 and 7, a passage (not shown in the drawings) is passed through the front end of the seat cushion pad P1 (FIG. 2) in the fore and aft direction, and the part of the skin member SK corresponding to the passage in the front end of the seat cushion pad P1 is fitted with a grommet 127 defining a hole so that the front end of the first grip member 118 may project from the front end surface of the seat cushion S1 via the grommet 127.

Thus, the vehicle occupant is able to pull the first rail cable 31 by gripping the first grip member 118 and pulling the first grip member 118 forward away from the seat cushion S1. Also, the vehicle occupant is able to pull the second rail cable 32 by gripping the second grip member 122 and pulling the second grip member 122 rearward. Thus, by pulling at least one of the first rail cable 31 and the second rail cable 32, the link mechanism 28 can be released from the locked condition so that the two rail lock members 17 are disengaged from the corresponding lock holes, and the upper rails 16 become moveable relative to the respective lower rails 15.

Figure 11:
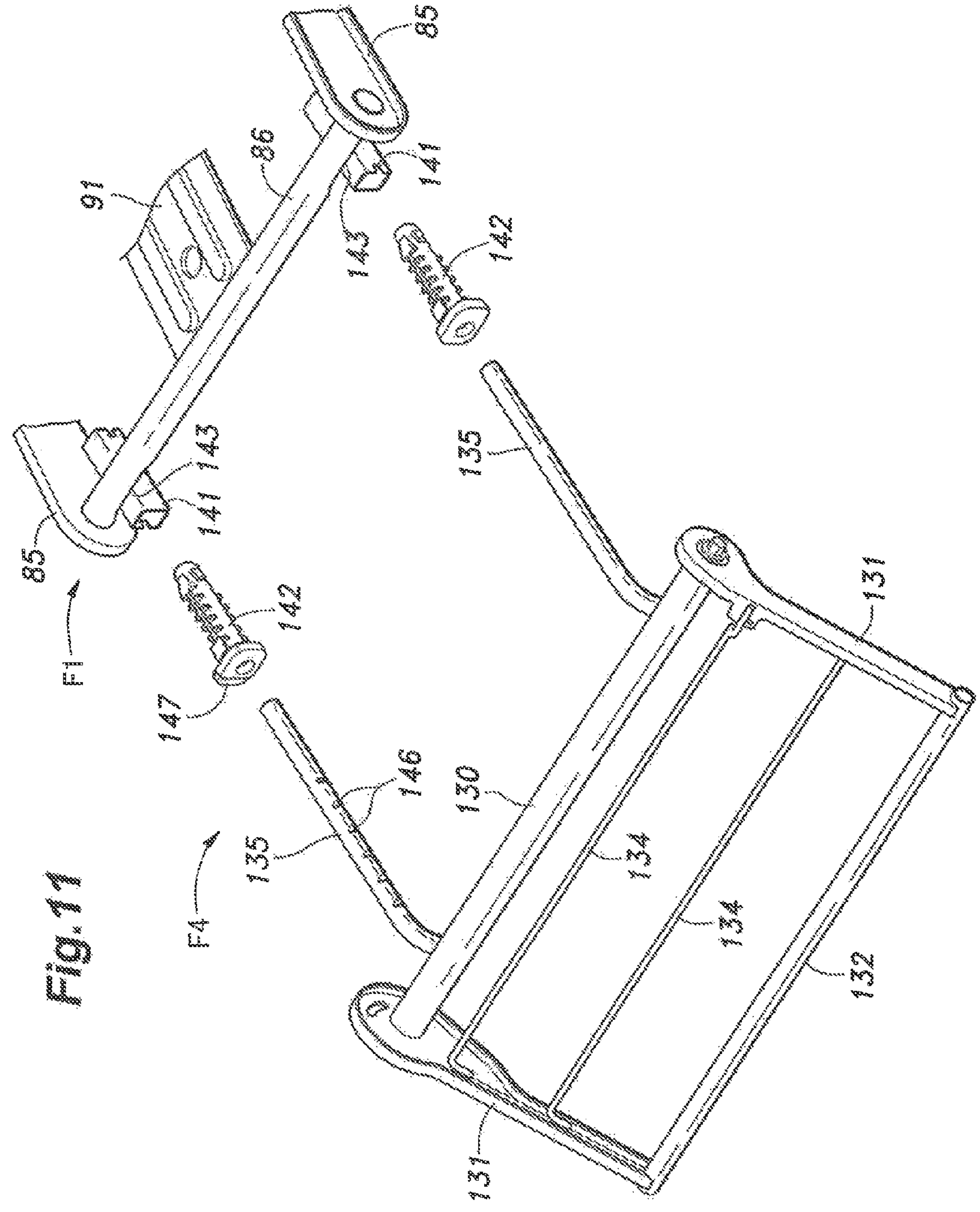
FIG. 11 is an exploded perspective view of the ottoman.

As shown in FIGS. 2, 5 and 11, the ottoman frame F4 includes a laterally extending base member 130, a pair of ottoman side frames 131 each rotatably supported to the corresponding end of the base member 130 at the base end thereof and extending to the free end thereof and a laterally extending ottoman front member 132 connected between the free ends of the ottoman side frames 131 so as to form a rectangular frame. A plurality of ottoman auxiliary members 134 are connected between the two ottoman side frames 131 in the space between the base member 130 and the ottoman front member 132. The base member 130 and the ottoman front member 132 are made of metallic pipe. Each ottoman side frame 131 is made by stamp forming sheet metal so that the major plane thereof faces laterally. The peripheral edge of each ottoman side frame 131 is bent laterally inward. The base member 130 is provided with a pair of ottoman pillars 135 laterally spaced from each other, and extending in parallel to each other. The ottoman pillars 135 are each made of a solid metallic rod.

The base member 130 is covered by a tubular base member pad 138 (FIG. 1). The outer surface of the base member pad 138 is covered by a skin member SK. The ottoman pad P4 (FIG. 2) is provided with a rectangular outer profile, and fitted on the two ottoman side frames 131 except for the base end parts thereof so as to cover the ottoman front member 132 and the ottoman auxiliary members 134. The base ends of the ottoman side frames 131 projecting from the tubular base member pad 138 and the skin member SK are fitted with covers 139 (FIG. 1) so as to conceal the connecting parts of the ottoman side frames 131 with the base member 130.

As shown in FIG. 11, the cushion front member 86 is provided with a pair of pillar support portions 141 for supporting the respective ottoman pillars 135. Each pillar support portion 141 consists of a tubular member having a rectangular cross section and two open ends. The pillar support portions 141 are mounted on parts of the cushion front member 86 located between the left cushion side frame 85 and the left edge of the center support member 91 and between the right cushion side frame 85 and the left edge of the center support member 91, respectively. The pillar support portions 141 are positioned such that the pillar support portions 141 extend in the fore and aft direction under the cushion front member 86, and the upper parts of the pillar support portions 141 are received in and welded to recesses 143 formed in the lower part of the cushion front member 86, respectively. A support 142 consisting of a tubular member made of plastic material is fitted into each pillar support portion 141. The ottoman pillars 135 are inserted into the inner bores of the supports 142 fitted in the respective pillar support portions 141 so that the ottoman frame F4 is thereby attached to the cushion frame F1.

A side surface of at least one of the two ottoman pillars 135 is formed with a plurality of the engagement grooves 146 at a regular interval along the length thereof. In the illustrated embodiment, the right ottoman pillar 135 is formed with the engagement grooves 146. As shown in FIG. 1, the front end of each support 142 is positioned on the exterior of the skin member SK of the seat cushion S1. Referring to FIG. 11 once again, the front end of the right support 142 is provided with a recess that receives an engagement member 147 in a moveable manner so that the engagement member 147 can be move between an entry position protruding into the inner bore of the support 142 and a retreat position displaced from the inner bore of the support 142. The engagement member 147 is normally urged by a biasing member not shown in the drawings to the entry position. An end of the engagement member 147 projects outward from a side of the front end of the corresponding support 142 so as to serve as an operation member 148 (FIG. 7) for the vehicle occupant to operate. By pushing the operation member 148, the vehicle occupant can displace the engagement member 147 from the entry position to the retreat position. The engagement member 147 maintains the current position of the ottoman pillar 135 relative to the support 142 by being engaged by one of the engagement grooves 146.

Figure 14:
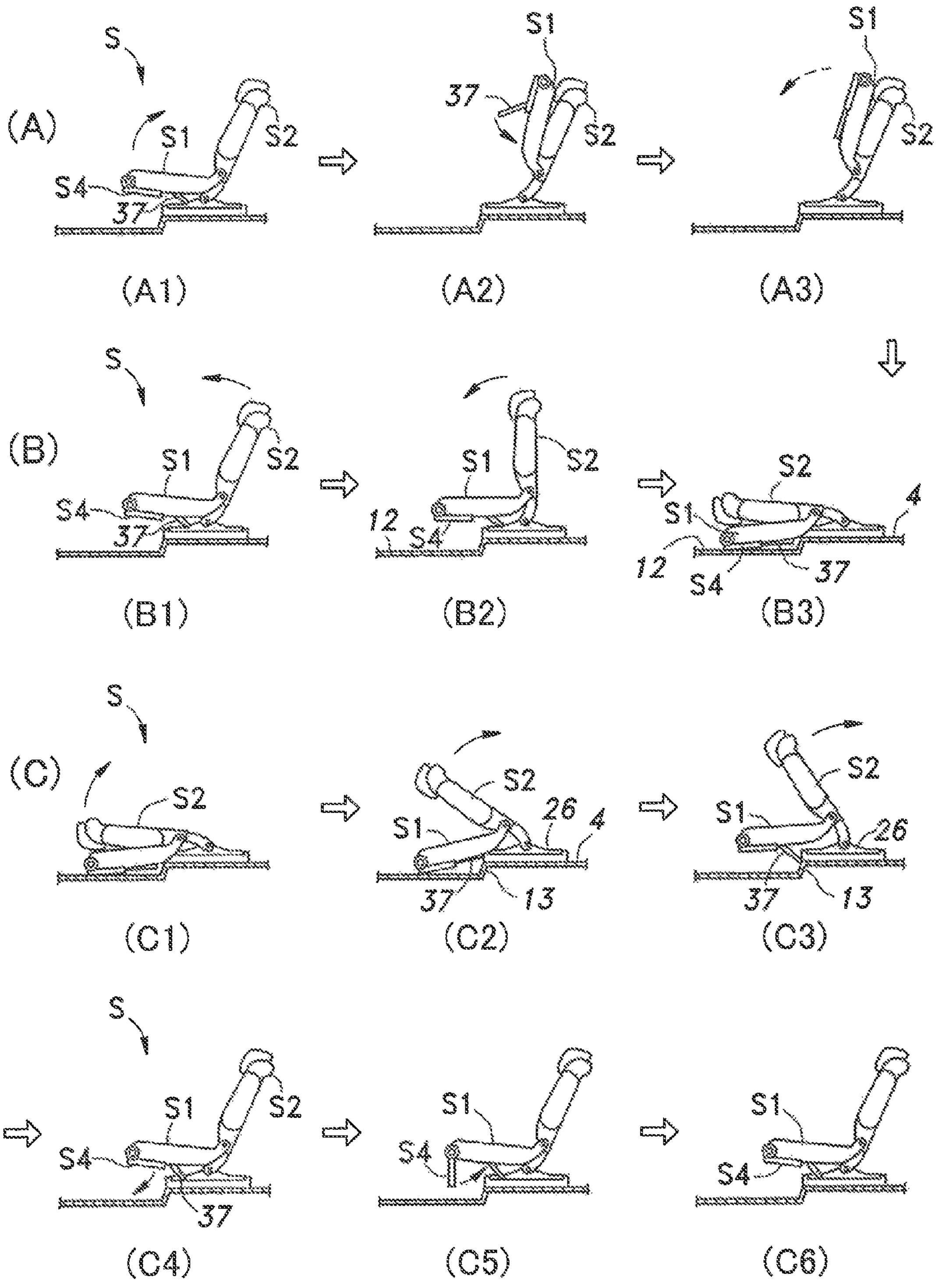
FIG. 14 are diagrams illustrating the mode of operation of the vehicle seat.
Figure 15:
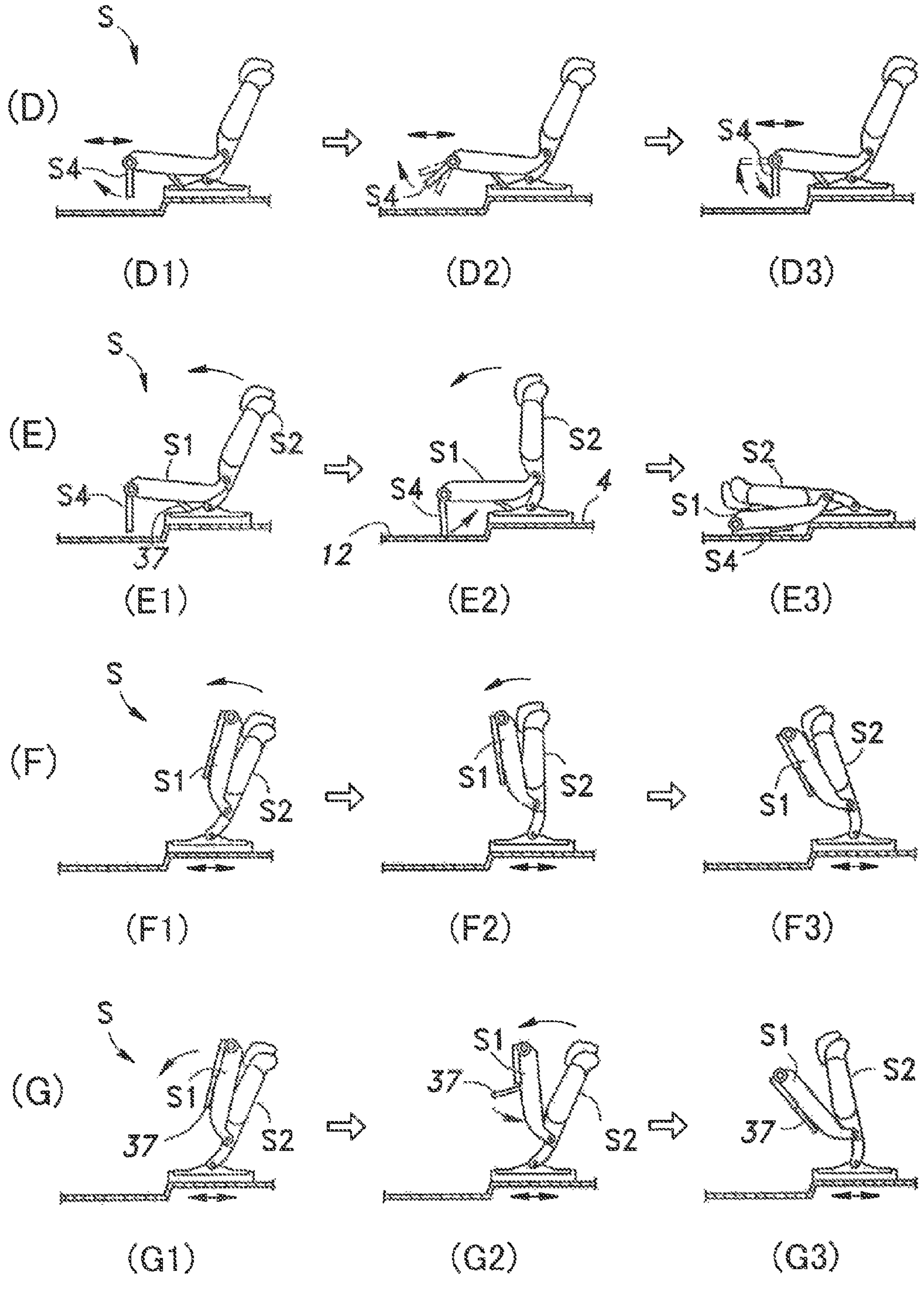
FIG. 15 are further diagrams illustrating the mode of operation of the vehicle seat.

The two ottoman side frames 131 can be tilted relative to the base member 130 between a retracted position shown in FIG. 14(A1) and a fully deployed position sown by imaginary lines in FIG. 15(D3). A half retracted position as shown in FIG. 15 (D1) is defined between the retracted position and the fully deployed position. In the retracted position, a most part of the ottoman S4 is stowed under the seat cushion S1, and the back side of the ottoman S4 opposes the lower surface of the seat cushion S1. In the half retracted position, the ottoman S4 is held vertically dependent from the base member 130. In the fully deployed position, the ottoman S4 projects forward from the seat cushion S1, and the support surface of the ottoman S4 faces a substantially same direction as the upper surface of the seat cushion S1.

A detent mechanism 165 (FIG. 5) as well as the angle adjustment mechanism 6 (FIG. 5) is interposed between the right end of the base member 130 and the right ottoman side frame 131. The angle adjustment mechanism 6 permits the clockwise rotation (toward the fully deployed position) of the right ottoman side frame 131 relative to the base member 130 as seen from the left hand side, and prohibits the counter clockwise rotation (toward the retracted position) of the right ottoman side frame 131 relative to the base member 130 as seen from the left hand side when the right ottoman side frame 131 is in any position between the half retracted position and the fully deployed position. Once the right ottoman side frame 131 has rotated relative to the base member 130 until the fully deployed position is reached, the angle adjustment mechanism 6 permits the clockwise rotation of the right ottoman side frame 131 relative to the base member 130 until the retracted position is reached. This angle adjustment mechanism 6 may consist of any per se known mechanism.

Figure 12:
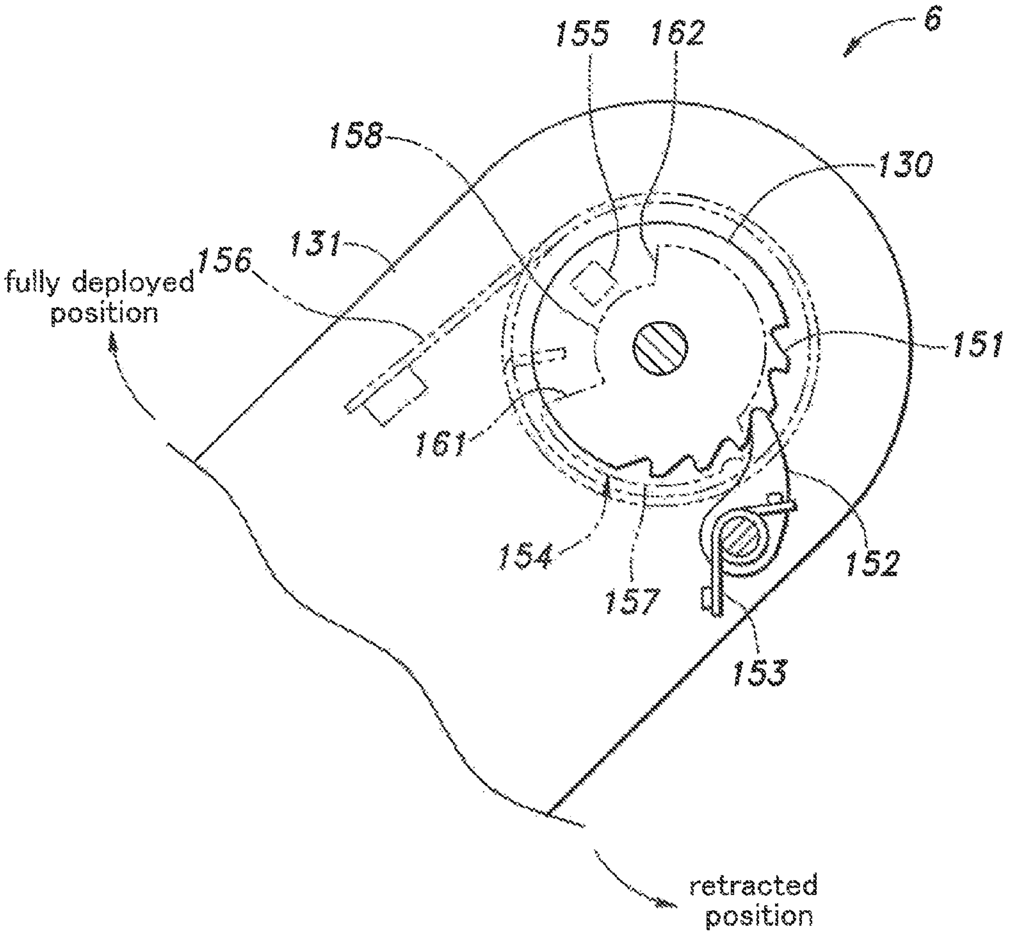
FIG. 12 is a fragmentary view of the angle adjustment mechanism of the ottoman.

In the illustrated embodiment, as shown in FIG. 12, the angle adjustment mechanism 6 includes ratchet teeth 151 fixedly attached to a peripheral part of the base member 130, a pawl 152 rotatably attached to the left side surface of the right ottoman side frame 131 and engageable with the ratchet teeth 151, a torsion spring 153 provided between the pawl 152 and the left side surface of the right ottoman side frame 131 to urge the pawl 152 against the ratchet teeth 151, a cam member 154 rotatably attached to the base member 130 in a coaxial relationship, and a projection 155 provided on the base member 130. A torsion coil spring 156 for normally urging the right ottoman side frame 131 to the retracted position is interposed between the base member 130 and the right ottoman side frame 131. Owing to the engagement of the pawl 152 with the ratchet teeth 151, the rotation of the right ottoman side frame 131 relative to the base member 130 is prevented. When the right ottoman side frame 131 rotates toward the fully deployed position relative to the base member 130, the pawl 152 can disengage from the currently engaged ratchet tooth 151 and engage the adjoining ratchet tooth 151.

The cam member 154 is provided with a large diameter portion 157 extending radially outward beyond the projecting ends of the ratchet teeth 151 with respect to the base member 130 and a small diameter portion 158 extending short of the root circle diameter of the ratchet teeth 151 with respect to the base member 130. The pawl 152 can engage the ratchet teeth 151 when opposing the small diameter portion 158 of the cam member 154, but cannot engage the ratchet teeth 151 when opposing the large diameter portion 157 by being engaged by the large diameter portion 157. When the pawl 152 opposes the small diameter portion 158 of the cam member 154, the pawl 152 is engaged by a boundary part between the large diameter portion 157 and the small diameter portion 158 so that the cam member 154 is rotated in response to the rotation of the right ottoman side frame 131 toward the fully deployed position relative to the base member 130. When the rotation of the right ottoman side frame 131 toward the fully deployed position relative to the base member 130 has advanced to an angular position adjoining the fully deployed position, the rotation of the cam member 154 relative to the base member 130 is restricted by the engagement of the projection 155 with a first stopper surface 161 of the cam member 154. As a result, the pawl 152 is rotated relative to the cam member 154, and rides over the outer periphery of the large diameter portion 157. Under this condition, the pawl 152 cannot engage the ratchet teeth 151, and the right ottoman side frame 131 is enabled to rotate relative to the base member 130 toward the retracted position.

While the pawl 152 rides over the outer periphery of the large diameter portion 157, and the right ottoman side frame 131 rotates relative to the base member 130, the cam member 154 receives a frictional force from the pawl 152 so that the pawl 152 and the right ottoman side frame 131 rotate as a single body relative to the base member 130. Once the rotation of the right ottoman side frame 131 relative to the base member 130 toward the retracted position advances to such an extent that the pawl 152 does not oppose the ratchet teeth 151 any more, the rotation of the cam member 154 relative to the base member 130 is restricted by the engagement of the projection 155 with a second stopper surface 162 of the cam member 154. As a result, the pawl 152 is enabled to rotate relative to the cam member 154, and moves along the outer periphery of the large diameter portion 157 to a position opposing the small diameter portion 158. Under this condition, the pawl 152 is enabled to engage the ratchet teeth 151 once again, and as the right ottoman side frame 131 has rotated relative to the base member 130 until the fully deployed position is reached, the pawl 152 engages the ratchet teeth 151.

Figure 13:
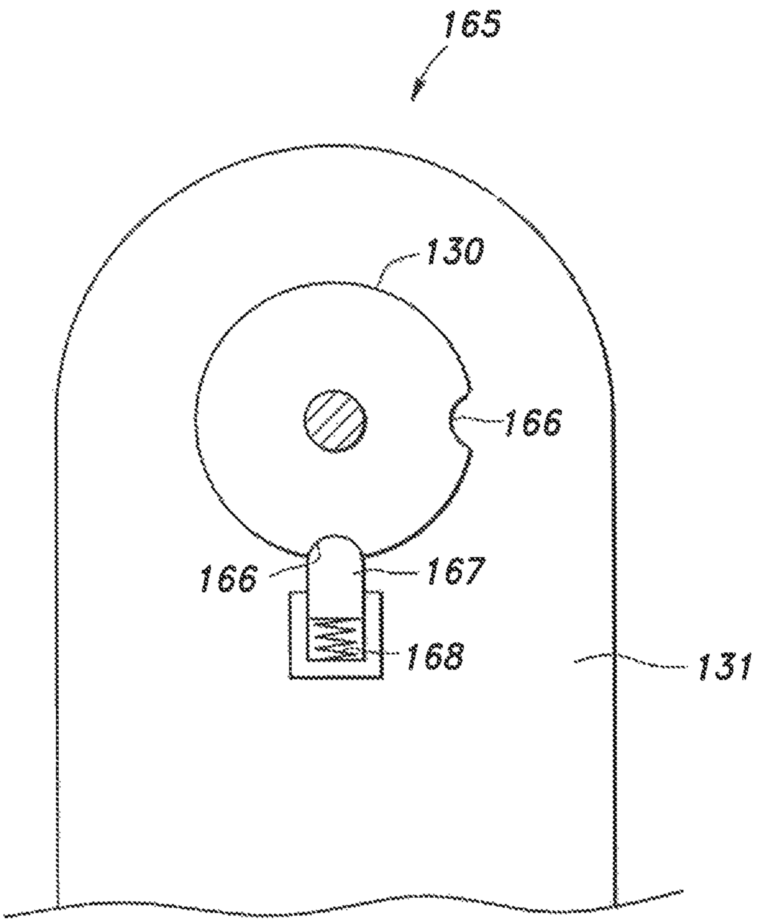
FIG. 13 is a fragmentary view of the detent mechanism of the ottoman.

The detent mechanism 165 retains the ottoman S4 at a plurality of prescribed angular positions with a suitable retaining force. In other words, the retaining force for the ottoman S4 becomes greater at each of such prescribed angular positions than at adjoining angular positions so that the ottoman S4 can be maintained in a half locked state at each of such prescribed angular positions. The detent mechanism 165 of the illustrated embodiment retains the ottoman S4 at two positions or at the half retracted position and the retracted position. The detent mechanism 165 may consist of any per se known mechanism. In the illustrated embodiment, as shown in FIG. 13, two recesses 166 are formed on the outer periphery of the base member 130, and the ottoman side frame 131 is provided with a half lock member 167 that can slide over the periphery of the ottoman side frame 131 and can be engaged by the recesses 166 under the biasing force of a biasing means 168 urging the half lock member 167 against the base member 130. The engaging surfaces of the recesses 166 and the half lock member 167 are formed by curved surfaces or slanted surfaces. In this detent mechanism 165, the recesses 166 and the half lock member 167 are engaged with each other when the ottoman S4 is in the half retracted position and in the retracted position, but are disengaged from each other when a torque of a prescribed value is applied to the ottoman S4. This prescribed torque value is greater than the torque owing to the weight of the ottoman S4 and the torque owing to the biasing force of the torsion coil spring 156.

The possible actions and the positions which the seat S discussed above can take are described in the following with reference to FIGS. 14 and 15.

FIG. 14(A1) shows the seat S with the seat back S2 in the use position, the seat cushion S1 in the seating position, and the ottoman in the retracted position. If the vehicle occupant releases the lock of the stand leg 37 by operating the handle 68 (FIG. 1), and tilts up the seat cushion S1 toward the seat back S2 as indicated by the arrow, the seat cushion S1 can be tilted up to the upper limit position (tip up position) where the seat surface of the seat cushion S1 is placed upon the front surface of the seat back S2 as shown in FIG. 14 (A2). Under this condition, the stand leg 37 is in the use position and projects from the bottom surface of the seat back S2, and the cam member 103 (FIG. 10) of the tip up mechanism 5 is being pulled by the first tip up cable 106 so that the lock member 102 is in the release position, and the angular position of the seat cushion S1 relative to the seat back S2 is not fixed. When the vehicle occupant collapses the stand leg 37 in the direction indicated by the arrow to the retracted position, the tip up mechanism 5 can be locked as shown in FIG. 14 (A3) so that the seat S is fixed in the tip up condition where the angular position of the seat cushion S1 is fixed, and the seat cushion S1 is in the tip up position.

Under the condition shown in FIG. 14 (B1) which is identical to that shown in FIG. 14 (A1), if the vehicle occupant operates the handle 68 (FIG. 1) to release the lock of the stand leg 37 and the lock of the reclining mechanism 3, the seat back S2 can be tilted forward. Under this condition, the tip up mechanism 5 cannot be locked, and the relative angle between the seat back S2 and the seat cushion S1 can be changed. If the seat back S2 is tilted forward, the stand leg 37 is disengaged from the support groove 35 (FIG. 8) of the stand base, and tilts forward. If the seat back S2 is tilted forward, the stand leg 37 is caused to collapse so that the seat S is placed in the dive down condition where the seat cushion S1, the seat back S2 and the ottoman S4 are stowed in a low level part 12 of the floor 4 as shown in FIG. 14 (B3). Under this condition, because the stand leg 37 is retracted, the first tip up cable 106 (FIG. 10) slackens, but because the seat back S2 has tilted forward by more than the prescribed angle, the cam member 103 of the tip up mechanisms 5 is pulled by the second tip up cable 107, and the lock member 102 is placed in the release position so that the angular position of the seat cushion S1 is not fixed relative to the seat back S2.

When the seat S is in the tip up condition as shown in FIG. 14 (A3), the vehicle occupant can place the seat S in the dive down condition shown in FIG. 14 (B3) by releasing the lock of the reclining mechanism 3 via the handle 68, and causing the seat back S2 along with the seat cushion S1 to tilt forward as indicated by the broken line arrow.

When the seat S in the dive down condition is desired to be returned to the use condition, as shown in FIG. 14(C1), the vehicle occupant releases the lock of the reclining mechanism 3, and tilts up the seat back S2 as indicated by the arrow. Because the tilt up mechanism 5 is not locked at this time, the seat cushion S1 does not tilt upward with the seat back S2, but is dragged by the seat back S2 in the rearward direction until the front end of the stand leg 37 engages the upright wall 13 of the floor 4 or the seat base 26. As the vehicle occupant tilts the seat back S2 rearward from this condition as shown in FIG. 14 (C3), the stand leg 37 is engaged by the upright wall 13 of the floor 4 or the seat base 26 to be raised up to the use position thereof. As the vehicle occupant tilts the seat back S2 further rearward, the cross member 94 (FIG. 8) of the stand leg 37 is forced into the support groove 35 of the stand base 34, displacing the engagement claw 41 during this process with the result that the seat back S2 is fixed in the use position and the seat cushion is fixed in the seating position as shown in FIG. 14 (C4). Because the stand leg 37 is raised up, and the bottom surface of the seat cushion S leaves the floor 4, the ottoman S4 is not engaged by the upright wall 13 of the floor 4, and when the seat S is placed in the seated condition shown in FIG. 14(CA), the ottoman S4 is retained in the retracted position under the biasing force of the torsion coil spring 156 and the retaining force of the detent mechanism 165.

The vehicle occupant can tilt the ottoman S4 from the state shown in FIG. 14(C4) in the direction indicated by the arrow to the half retracted position where the ottoman D4 hangs down as shown in FIG. 14(C5). The ottoman S4 is detained in the half retracted position by the detent mechanism 165. When the angular position of the ottoman S4 is between the retracted position and the half retracted position, because the angle adjustment mechanism 6 does not retain the ottoman S4, the ottoman can be tilted in any desired direction. Therefore, by tilting the ottoman S4 from the state shown in FIG. 14(C5) in the direction indicated by the arrow once again, the ottoman S4 can be moved to the retracted position where the ottoman S4 opposes the bottom surface of the seat cushion S1 as shown in FIG. 14(C6).

When the vehicle occupant further tilts the ottoman S4 in the half retracted position in the direction indicated by the arrow as shown in FIG. 15 (D1), the ottoman S4 can be fixed at any angular position (deployed position) selected by the vehicle occupant via the angle adjustment mechanism (or is prevented from rotating toward the half retracted position). The vehicle occupant is able to release the lock of the ottoman pillar 135 relative to the seat cushion S1 by operating the engagement member 147 (FIG. 11), and move the ottoman S4 in the fore and aft direction to the desired position to be fixed therein. When the ottoman S4 is not needed any more, by tilting the ottoman S4 in the direction indicated by the arrow in FIG. 15 (D2) until the fully deployed position indicated by the broken lines in FIG. 15 (D3) is reached, the locking action by the angle adjustment mechanism 6 can be released. Once the locking action by the angle adjustment mechanism 6 is released, the ottoman S4 tilts downward under the own weight and the biasing force of the torsion coil spring 156, and is retained in the half retracted position.

When the ottoman S4 is in the half retracted position, the seat S in the use condition can be changed into the dive down condition by releasing the lock of the stand leg 37 and the lock of the reclining mechanism 3 via the handle 68 (FIG. 1) as shown in FIG. 15 (E1), and tilting the seat back S2 forward as indicated by the arrow. As a result, as shown in FIG. 15 (E2), the front end of the ottoman S4 abuts the low level part 12 of the floor 4, and the seat cushion S1 moves obliquely forward and downward so that a force directed obliquely rearward and upward is applied from the floor 4 to the front end of the ottoman S4, and the ottoman S4 tilts toward the retracted position. In the dive down condition of the seat S where the seat back S2 has completely tilted forward as shown in FIG. 15 (E3), the ottoman S4 is maintained in the retracted position under the biasing force of the torsion coil spring 156, and by the retaining action of the detent mechanism 165. Therefore, when the vehicle occupant has performed a series of operation shown in FIG. 14 (C) to return the seat S from the dive down condition to the use condition, the ottoman S4 remains in the retracted position even after the seat S has been put back to the use condition.

Other possible positions that the seat S can take are described in the following with reference to FIG. 15 once again. When the seat cushion S1 is in the tip up position as shown in FIG. 15 (F1), the seat back S2 along with the seat cushion S1 can be tilted forward by releasing the lock of the reclining mechanism 3 via the handle 68. The seat back S2 and the seat cushion S1 are fixed at the position where the handle 68 is released. For instance, as shown in FIG. 15 (F2), the reclining mechanism 3 can be locked when both the seat back S2 and the seat cushion S1 are tilted upright. Also, as shown in FIG. 15 (F3), the reclining mechanism 3 can be locked when the seat back S2 is tilted forward from the upright position. As can be readily appreciated, in any of the positions shown in FIG. 15 (F1) to FIG. 15 (F3), the vehicle occupant can tilt the seat back S2 and the seat cushion S1 in the fore and aft direction by releasing the lock of the slide mechanism 2 via the first grip member 118.

When the seat S is in the tip up condition as shown in FIG. 15 (G1), the vehicle occupant can tilt the stand leg 37 to the use position to release the lock of the tip up mechanism 5 to cause the seat cushion S1 to tilt relative to the seat back S2 as shown in FIG. 15 (G2). By returning the stand leg 37 to the retracted position, the vehicle occupant can lock the seat cushion S1 relative to the seat back S2 at any desired angular position. It is also possible for the vehicle occupant to release the lock of the reclining mechanism 3 via the handle 68 under this condition, and tilts the seat back S2 along with the seat cushion S1 forward to cause the seat S to be fixed in this forwardly tilted condition. The forwardly tilted condition of the seat S shown in FIG. 15 (G3) can also be accomplished by operating the stand leg 37 from the condition shown in FIG. 15 (F3) so as to release the lock of the tip up mechanism 5, and then tilting the seat cushion S1 forward.

According to the seat S described above, as discussed earlier in conjunction with FIG. 6, the projection 112 that fixes the end of the second tip up outer tube 109 on the side of the seat back S2 is positioned on the inner side of the corresponding back side frame 46. Therefore, the gap between the back side frame 45 and the cushion side frame 86 placed on the outer side of the back side frame 45 can be minimized so that the lateral dimension of the seat is not required to be increased.

As shown in FIG. 6, the projection 112 is positioned lower than the lower edge of the pipe frame 45 forming the cushion frame F1 when the seat back S2 is in the user position. Therefore, the projection 112 does not obstruct the various changes that can be made to the configuration of the seat S so that an efficient space utilization can be achieved, and the lateral dimension of the seat is not required to be increased.

In the illustrated embodiment, the reinforcement plate 47 is connected between the pipe frame 45 forming the cushion frame F1 and each back side frame 46, and the projection 112 is integrally formed in one of the reinforcement plates 47. Therefore, no extra component is required for fixing the end of the second tip up outer tube 109 on the side of the seat back S2 so that the number of component parts and the amount of assembly work can be reduced. Furthermore, as discussed earlier, this projection 112 projects inward from the left side of the right reinforcement plate 47 formed integrally with the right back side frame 46 positioned on the outer side of the seat base 26 to a position overlapping with the right slide member 21 so that the projection 112 also serves as a stopper that prevents the rearward rotation of the right back side frame 46 by abutting the right slide member 21. Therefore, no extract component is required for the stopper so that the number of component parts and the amount of assembly work can be reduced.

As discussed earlier in conjunction with FIG. 10, the tip up mechanism 5 functioning as a lock device for fixing the seat cushion S1 to the seat back S2 in the tip up position by using the engagement notches 101, the lock member 102 that can selectively engage the engagement notches 101 and a cam member 103 configured to cooperate with the lock member 102. This tip up mechanism 5 is provided on the outer side of the right cushion side frame 85. Meanwhile, as discussed earlier in conjunction with FIG. 6, the support plate 89 having the free end that rotatably support the seat cushion S1 is attached to the fastening seat 88 formed on the outer side of the right back side frame 46, and the recess 90 for passing the second tip up outer tube 109 in the fore and aft direction in regard to the seat back S2 in the use position is formed below the fastening seat 88.

Thereby, the second tip up outer tube 109 can be positioned so as to pass the vicinity of the connecting part between the cushion side frame 5 and the support plate 89 without interfering with the tip up mechanism 5. By positioning the second tip up outer tube 109 in this manner, the second tip up outer tube 109 is prevented from being swung around by the rotational movement of the seat cushion S1.

In this embodiment, the first rail cable 31 is also passed through the recess 90 formed below the fastening seat 88. Thereby, the first rail cable 31 is also enabled to pass the vicinity of the connecting part between the cushion side frame 5 and the support plate 89 without interfering with the tip up mechanism 5, and the first rail cable 31 is likewise prevented from being swung around by the rotational movement of the seat cushion S1.

Furthermore, in the illustrated embodiment, as shown in FIG. 6, the base end of the right cushion side frame 85 is positioned between the support plate 89 and the back side frame 46 so that the rightward projecting dimension of the tip up mechanism attached the outer side of the right cushion side frame 46 beyond the support plate 89 can be minimized, and the lateral dimension of the seat S is not required to be increased.

The foregoing embodiments are merely exemplary, and the present invention can be modified in various ways without departing from the spirit of the present invention. For instance, the foregoing embodiments were directed to a seat S for land vehicles, but the present invention is equally applicable to seats S for aircraft and watercraft.

In the foregoing embodiment, the fixing part for fixing the end of the second tip up outer tube 109 on the side of the seat back S2 consisted of the projection 112 integrally formed with the reinforcement plate 47, but the fixing part may be formed as a separate member which is attached to the reinforcement plate 47. Alternatively, the fixing part may be integrally formed in the lower edge or the side edge of the back side frame 46 or the pipe frame 45, or may consist of a separate member which is attached to the lower edge or the side edge of the back side frame 46 or the pipe frame 45.

The arrangement of the second tip up outer tube 109, the configuration of the back side frames 46, the presence or absence of the support plate, as well as the specific structures, arrangements, numbers, angles and materials of the various components and parts, can be modified freely without departing from the spirit of the present invention. All of the various components of the seats S of the embodiments described above are not entirely essential for the present invention, but can be modified, substituted or omitted without departing from the spirit of the present invention.

GLOSSARY OF TERMS

| | | | |
|---|---|---|---|
| 2 | slide mechanism | 5 | tip up mechanism |
| 26 | seat base | | |
| 31 | first rail cable (slide lock cancel cable) | | |
| 45 | pipe frame (seat back frame) | 46 | back side frame |
| 47 | reinforcement plate (reinforcement member) | | |
| 85 | cushion side frame | 88 | fastening seat |
| 89 | support plate (support member) | 90 | recess |
| 107 | second tip up cable | | |
| 109 | second tip up outer tube (cable encasing member) | | |
| 112 | projection (fixing part) | | |
| 113 | tip up lock cancel mechanism | S | seat |
| S1 | seat cushion | S2 | seat back |

The invention claimed is:

1. A vehicle seat comprising a seat back pivotally attached to a seat base, a seat cushion attached to the seat back in a rotatable manner relative to the seat back between a seating position and a tip up position tilted upward toward the seat back, a tip up mechanism for retaining the seat cushion at least in the tip up position and a tip up lock cancel mechanism for releasing the seat cushion from the tip up position effected by the tip up mechanism in response to a forward tilting movement of the seat back, wherein:

the seat back includes a pair of back side frames extending downward and connected to the seat base;

the tip up lock cancel mechanism includes a cable encasing member having one end fixed to the seat cushion and another end fixed to one of the back side frames via a fixing part, and a cable slidably received in the cable encasing member and having one end connected to the tip up mechanism and another end connected to the seat base, the fixing part for fixing the cable encasing member to the back side frame being located on an inner side of the back side frame; and wherein the seat back includes a seat back frame made of pipe material and a reinforcement member extending between the seat back frame and each back side frame, and the fixing part is integrally formed with the reinforcement member.

2. The vehicle seat according to claim 1, wherein the seat back frame of the seat back is formed by connecting an upper member, a pair of side members and a lower member with one another such that the seat back frame has a substantially rectangular shape, and the fixing part is located lower than the lower member when the seat back is in the use position.

3. The vehicle seat according to claim 1, wherein the back side frame corresponding to the fixing part is provided on an outer side of the seat base, and the fixing part projects inwardly of the seat in a position laterally corresponding to the seat base, and is configured to restrict a rearward tilting of the seat back by engaging the seat base.

4. A vehicle seat comprising a seat back pivotally attached to a seat base, a seat cushion attached to the seat back in a rotatable manner relative to the seat back between a seating position and a tip up position tilted upward toward the seat back, a tip up mechanism for retaining the seat cushion at least in the tip up position and a tip up lock cancel mechanism for releasing the seat cushion from the tip up position effected by the tip up mechanism in response to a forward tilting movement of the seat back, wherein:

the seat back includes a pair of back side frames extending downward and connected to the seat base;

the tip up lock cancel mechanism includes a cable encasing member having one end fixed to the seat cushion and another end fixed to one of the back side frames via a fixing part, and a cable slidably received in the cable encasing member and having one end connected to the tip up mechanism and another end connected to the seat base, the fixing part for fixing the cable encasing member to the back side frame being located on an inner side of the back side frame, and wherein the seat cushion includes a pair of cushion side frames pivotally attached to the seat back at respective base ends thereof, the tip up mechanism being attached to an outer side of one of the cushion side frames, and the seat back further includes a support member attached to a fastening seat formed on an outer side of the corresponding back side frame and having a lower free end rotatably supporting the seat cushion, a recess for passing the cable encasing member in a fore and aft direction when the seat back is in the use position being formed in an outer side part of the back side frame located below the fastening seat.

5. The vehicle seat according to claim 4, wherein the base end of each cushion side frame is positioned between the corresponding support member and the back side frame.

6. The vehicle seat according to claim 4, further comprising a slide mechanism for permitting the seat base to slide in the fore and aft direction and selectively fixing the seat base at a selected fore and aft position, wherein the slide mechanism includes a slide lock cancel cable for releasing a lock of a slide position of the seat base, and the slide lock cancel cable is passed through the recess.

* * * * *